United States Patent [19]

Baker et al.

[11] Patent Number: 4,650,292
[45] Date of Patent: Mar. 17, 1987

[54] ANALYTIC FUNCTION OPTICAL COMPONENT

[75] Inventors: James G. Baker, Bedford, N.H.; William T. Plummer, Concord, Mass.

[73] Assignee: Polaroid Corporation, Cambridge, Mass.

[21] Appl. No.: 566,311

[22] Filed: Dec. 28, 1983

[51] Int. Cl.⁴ .................................................. G02B 3/02
[52] U.S. Cl. ..................................... 350/432; 350/423; 350/247
[58] Field of Search ..................... 350/432, 423, 247; 351/169

[56] References Cited

U.S. PATENT DOCUMENTS

| | | | |
|---|---|---|---|
| 2,263,509 | 11/1941 | Lewis . | |
| 3,305,294 | 2/1967 | Alvarez | 351/169 |
| 3,507,565 | 4/1970 | Alvarez et al. | 351/17 |
| 3,583,790 | 6/1971 | Baker | 350/184 |
| 3,617,116 | 11/1971 | Jones | 351/177 |
| 3,632,696 | 1/1972 | Jones | 264/1 |
| 3,751,138 | 8/1973 | Humphrey | 350/181 |
| 3,758,201 | 9/1973 | MacNeille | 351/25 |
| 3,827,798 | 8/1974 | Alvarez | 350/189 |

FOREIGN PATENT DOCUMENTS

998191 7/1965 United Kingdom .

*Primary Examiner*—John K. Corbin
*Assistant Examiner*—P. M. Dzierzynski
*Attorney, Agent, or Firm*—Francis J. Caufield

[57] ABSTRACT

Optical elements shaped in accordance with preferred analytic functions which permit the elements to be relatively rotated about one or more pivots decentered with respect to an optical axis to simulate the dioptric action of a well corrected rotational lens element of variable power that can be used to maintain focal setting over a large range of object distances. The optical elements can be used in pairs, singly with mirror images of themselves, or they can be incorporated in more elaborate systems to provide focusing action.

38 Claims, 11 Drawing Figures

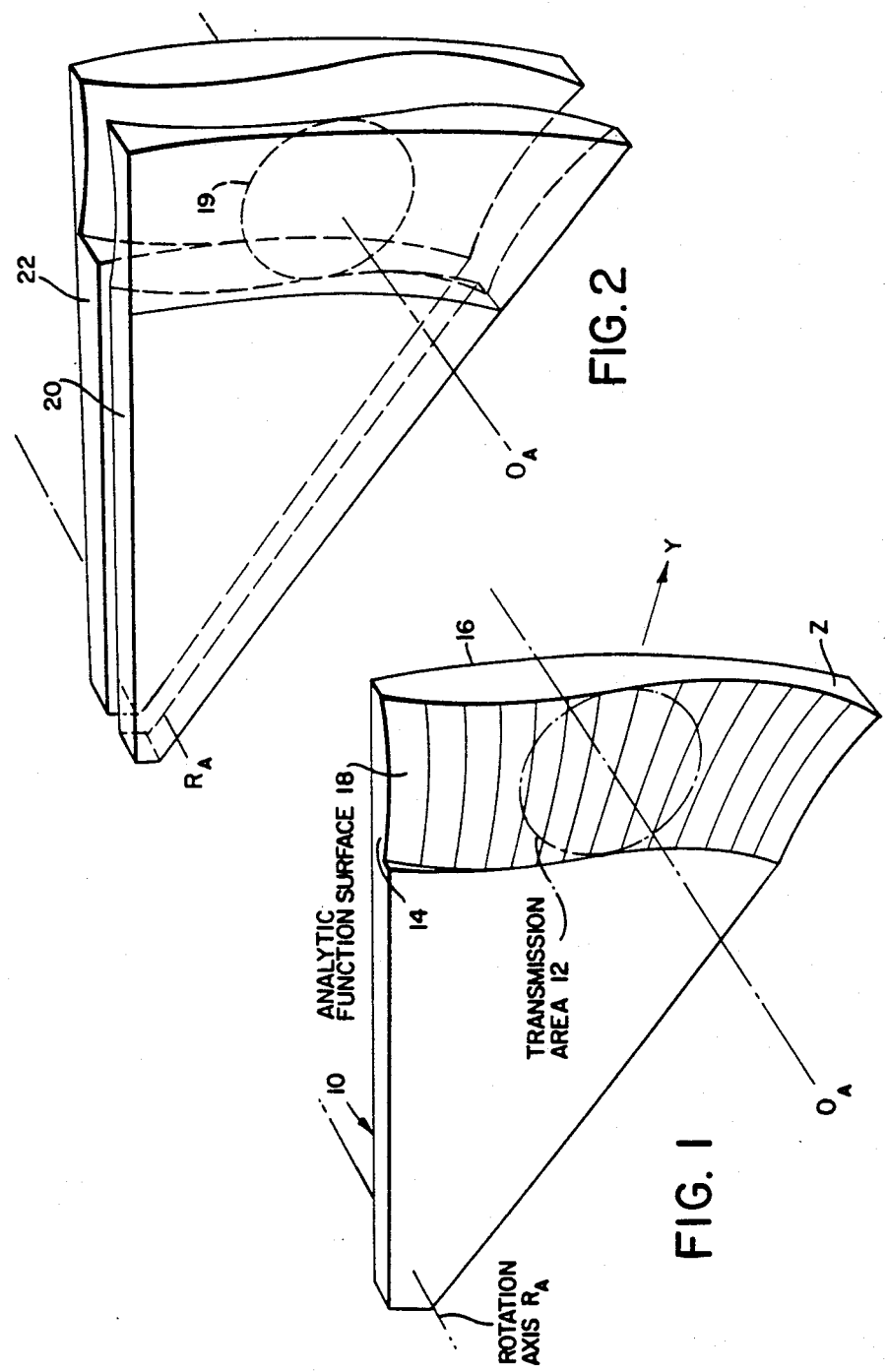

ANALYTIC FUNCTION OPTICAL COMPONENT

BACKGROUND OF THE INVENTION

This invention in general relates to optical systems which are particularly suitable for use in cameras and, in particular, to optical elements having preferred shapes in the form of analytic functions which permit their rotation about one or more decentered pivots to maintain the focal setting of a photographic objective over a large range of object distances.

From the earliest use of hand cameras, it has been recognized that a change in object distance with respect to the location of the camera objective lens causes an inevitable but easily calculated change in image distance which, if not compensated in some way, leads directly to a degradation of image quality over the chosen field of view. Everyone who has made use of photographic objectives becomes aware of this fundamental fact, and indeed camera manufacturers have adopted several convenient means for bringing the aerial image and the sensitive photographic film or coated glass plate into registration.

The most natural means, one employed from the beginning, is simply the technique of moving the position of the photographic objective along the optical axis for the purpose of focusing. Generally, the film plane remains stationary. However, there are cameras and certainly telescopes with movable film or plate holders, particularly where the photographic equipment is large and cumbersome. In either case, the distance from objective to film is changed in such a way that the image can be focused onto a ground glass and thereafter onto a substituted photographic emulsion or other form of light sensitive surface.

In some cameras, particularly in the modern era, it has proved to be convenient to restrict the focusing movement to but a portion of the optical system, generally but a single element or component. The movable element or component, however, is a mixed blessing inasmuch as the image quality may suffer as a result of the displacement of the element or component from its optimum position. Various aberrations that have been minimized or balanced for good image quality under average conditions reappear or become larger on displacement of an element or component. Both lateral and longitudinal chromatic aberrations may reappear, along with an enhancement of spherical aberration, coma, and astigmatism. However, careful design has often resulted in practicable systems with substantial range in object distances and even in magnification, as for example, the various forms of zoom systems now generally available.

Other forms of focusing have also been introduced. It is possible to interchange lens elements providing a discrete change in dioptric powers to provide a reduced focusing range for each, within which individual range the image quality can remain reasonably stable. The sequence of focusing ranges can then be made to overlap in such a way that the convertible system can be used over a large range of object distances. This technical means becomes all the easier if the focusing interchangeable elements are inherently of low dioptric power, whether positive or negative. In this way, the weak element in use at any given time interferes only slightly with the image quality and indeed may be used to improve the quality if suitably located and shaped. With moldable elements use can be made of an aspheric "touch-up" to improve the image quality selectively within the individual range. If the dioptric lens elements are mounted onto a rotor or disc for easy interchange, the rotor can be referred to as a set of Waterhouse elements. Waterhouse discs have also been used from long ago for aperture control and for insertion of readily interchangeable filters.

Still another form of focusing involves the use of liquid filled flexible cells which with changing pressure can be made to perform weak dioptric tasks such as focusing. Ordinarily, the changes in sagittae associated with dioptric focusing of hand camera objectives are very small, whether positive or negative, and for the usual focal lengths can be measured in but a few dozens of micrometers. It is necessary, however, that the deformed flexible cell provide sufficiently smooth optical surfaces for acceptable image quality after focusing has been performed.

Still another form of focusing has been introduced in U.S. Pat. No. 3,305,294 issued to L. W. Alvarez on Feb. 21, 1967. In this device a pair of deformed plates are moved transversely in equal but opposite displacements. The plates have the same shapes but are opposed such that in the "null" position the variations in thickness cancels and the two plates used together have zero dioptric power. Polynomial expressions are used to define the common aspheric shape and are strongly dependent on cubic terms in a power series in two variables. The polynomial coefficients are carefully chosen to allow the plates to simulate by transmission and refractions the performance of a dioptric lens. When the plates are moved transversely with respect to one another, the net effect is a simulation of a bi-convex or bi-concave simple element thereby providing for a continuous range of dioptric powers. Even though the deformed plates of Alvarez produce desirable variations in focal length within small space requirements, the thin lens systems which they simulate are not of themselves well-corrected for aberrations in many applications.

In previous U.S. Pat., No. 3,583,790, issued to James G. Baker there has been provided transversely slideable plates which are an improvement over the above mentioned Alvarez plates in that focusing action can be achieved while also correcting for aberrations. Here, it has been shown that even one special lens element, one of whose surfaces is plane and the other of a preferred polynomial shape, or more generally, of a shape defined by a preferred analytic function, can be transversely slid to effect focusing action while at the same time minimizing certain aberrations. It has also been shown that the refractive action of the sliding element, when combined with the refractive action of a fixed, opposed optical surface on a nearby fixed optical element, which opposed surface is shaped in accordance with a preferred analytic function, can be made to simulate the dioptric action of a well-corrected rotational lens element of variable power.

It has now been found that another type of lateral motion can also be employed for effecting focal action. Consequently, it is a primary purpose of this invention to set forth examples of how this novel kind of lateral motion can be employed, with adequate optical precision, to lead to a similar kind of simulation of a rotational dioptric element of variable power.

It is a further purpose of this invention to provide optical elements having preferred shapes which make it possible to relatively rotate at least two of such elements to maintain focus according to the object distance.

It is yet another purpose of the present invention to provide optical elements having preferred shapes in the form of analytic functions which permit the elements to be rotated about one or more pivots decentered with respect to an optical axis to simulate the optical action of variable dioptric and rotationally symmetric aspheric elements.

It is still another purpose of the present invention to provide two or more rotatable elements which can have different analytic function surfaces and still simulate the optical action of combined variable power dioptric and aspheric rotational elements.

Other objects of the invention will in part be obvious and will in part appear hereinafter. Accordingly, the invention comprises the optical elements and systems possessing the construction, combination and arrangement of elements which are exemplified in the following detailed description.

SUMMARY OF THE INVENTION

This invention in general relates to optical systems which are particularly suitable for use in photographic cameras and, in particular, to optical elements that are shaped in accordance with preferred analytic functions or preferred polynomials which permit the elements to be relatively rotated about one or more pivots decentered with respect to an optical axis to simulate the dioptric and aspheric action of a well-corrected rotational lens element of variable power which can be used to maintain focal setting over a large range of object distances or for more complex tasks. For this purpose, the optical elements can be used singly with mirror images of themselves, or in pairs, or they can be incorporated in more elaborate systems to provide focusing action.

The general shape of the analytic function surfaces can be represented by preferred truncated polynomial equations in two independent variables having the general form given by:

$$\bar{z}_i = \sum_{j=0}^{n} \sum_{k=0}^{(n-j)} A_{ijk} \bar{x}^j \bar{y}^k$$

where i refers to surface numbers, $A_{ijk}$ represent coefficients, and $\bar{x}$, $\bar{y}$, and $\bar{z}$ refer to coordinates in a preferred non-Cartesian coordinate system.

Several examples of the use of such elements are described including systems which utilize a pair of elements one of which is rotated about an axis of revolution offset and parallel with respect to a system optical axis. In each of the examples, the novel element typically is a transparent element, preferably molded of a suitable optical plastic. On one side of the element there is provided a first surface that has a predetermined shape which is at least a part of a surface of revolution which for precision systems is preferably plano and on the other side a second aspheric surface that is asymmetric and can be described mathematically by a preselected polynomial equation having at least one nonzero term of at least fourth degree. The first and second surfaces of the elements are structured so that the element can be displaced generally laterally relative to the optical axis by rotation of the element about an axis of revolution, other than the optical axis, such that the second element surface operates to continuously change certain optical performance characteristics as the element moves relative to the optical axis while the first element surface remains optically invariant, not effecting any changes in any optical performance characteristics, as the element moves relative to the optical axis.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

FIG. 1 is a diagrammatic perspective view of an optical element of the invention showing its general features;

FIG. 2 is a diagrammatic perspective view showing a pair of optical elements of the invention;

DETAILED DESCRIPTION

Figure 3:
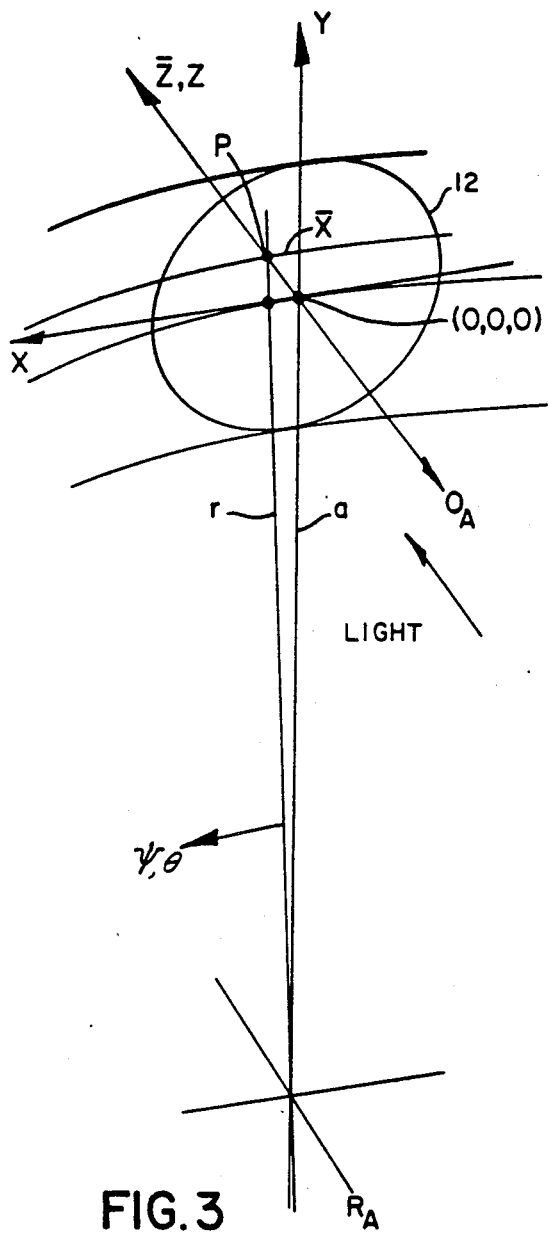
FIG. 3 is a perspective view illustrating coordinate systems used in describing the novel surfaces of the optical elements of the invention.

As previously stated, this invention generally relates to optical systems particularly suitable for use in cameras, and, more specifically, to optical elements having preferred shapes, defined in form by preferred polynomials or more generally by preferred analytic functions. These novel elements are unlike the prior art transversely slideable elements because their preferred analytic function surfaces permit them to be rotated about pivots decentered with respect to an optical axis to maintain focal setting or to perform more elaborate functions over a large range of object distances.

FIG. 1 shows in diagrammatic fashion an element 10 having the general characteristics representative of the invention. The element 10 is a thin, transparent annular segment that can be mounted with any suitable mechanical means for rotation about an axis, RA, which is parallel to and offset with respect to an optical axis, OA. Along the optical axis, OA, there is shown a nominally circular area 12 which may be taken to be an aperture of maximum diameter in a designated plane in which the element 10 more or less resides. Through the transmission area 12 bundles of rays pass through the element 10 when traveling from object to image space.

Around the periphery of element 10 is a section 14 of constant radial width that can be selectively moved into optical alignment with transmission area 12 by rotation of element 10 about the rotation axis, RA. One surface (16) of the peripheral section 14, as shown here, is planar and as such produces no change in its optical effect across the transmission area 12 as element 10 rotates. Opposing the surface 16 is another surface, 18, shown in exaggerated fashion and facing out of the paper. The surface 18 is distorted in the shape of a preferred analytic function that is selected according to the teaching of the invention such that useful optical changes are effected by the surface 18 as the element 10 rotates about the rotation axis, RA. It is the shape of the surface 18, or similar surfaces, that is the crux of the invention. As will be shown hereinafter, proper selection of the shape of an analytic function surface such as that of 18 allows an element such as 10 to be used with other closely spaced similar elements to simulate rotationally symmetric dioptric or aspheric elements of variable power. Moreover, such elements, when used in combination, can be used with one or more fixed in place and others rotating or all rotating about the same or different axes whether in the same or in opposite directions to accomplish the tasks of simulation. FIG. 2, for example, diagrammatically illustrates a pair of such elements, designated at 20 and 22, adapted to oppositely rotate about the displaced axis of rotation, RA. Such elements can also be incorporated in more elaborate systems as the examples to follow will illustrate.

To clearly understand the nature of the analytic function surfaces of the invention and the specific examples in which they may be incorporated, it will first be necessary to describe various coordinate systems which have been found convenient for defining them along with a general description of important design considerations in their use and, as well, a procedure by which their shapes can be calculated and specified.

FIG. 3 illustrates the various coordinate systems found useful in analyzing, defining and specifying the analytic function surfaces of the optical elements of the invention. The first one, most convenient for facilitating manufacturing, is a cylindrical coordinate system arranged in a transverse plane for the treatment of the analytic surface mathematically such that the origin of coordinates in the x-y plane lies at the displaced assignable pivot point, the intersection of the rotation axis, RA, with the x-y plane. The rotation axis, RA, through the pivot point is taken to be parallel to the optical axis, OA, and hence the geometry in the transverse reference plane is of polar form and the analytic shape can be defined in principle in terms of ordinary polar coordinates. That is, the coordinates of a point, P, on the analytic surface in the transverse plane are given by the coordinates r and phi. A preferred shape in three-dimensional space in the polar system is completely defined with the sagittal depth, z, or departure from the transverse plane expressed as functions of the polar coordinates in the transverse plane.

Apart from the use of polar coordinates, use is also made of at least two other coordinate systems. The first of these is the x-y-z system normally employed in the course of optical design, whereby the optical axis, OA, is taken to be the z-axis, the y-z plane is taken to be the meridional plane and the x-axis, as the skew axis, is perpendicular to either. As viewed by an observer who is looking from the rear of an objective toward its front, the values of z are positive toward the observer, the values of y are positive upwards in the meridional plane, and the values of x are positive to the right. Conversely, as seen from the front of an objective, one notes that y-values are positive upwards, x-values are positive to the left and z-values are positive away from the observer. For any given surface it is convenient to locate the origin of coordinates at the vertex, namely, at the point of intercept of the optical axis with the surface.

In addition use can be made of an auxiliary non-Cartesian frame of reference such that its origin of coordinates, as for the x-y-z system, lies on the optical axis, OA, at the point of intersection of the optical axis, OA, with the transverse reference (x-y) plane. In some cases the respective origins in the two systems may be related by a translational shift along the z-axis.

The new non-Cartesian frame of reference is related approximately to the x-y-z system but of itself involves arcs and radial extensions in the polar system. Thus, distances along any radius from the pivot point below in FIG. 3, less the assigned radial distance from the pivot point below to the origin of coordinates (o,o,o), become the newly defined values of $\bar{y}$. Positive $\bar{y}$-values are to the top of the origin of coordinates. The lengths of arcs concentric about the pivot point, as measured along the arcs from the $\bar{y}$-axis, become the newly defined values of $\bar{x}$, and are positive to the left, although still arcs. The quantity $\bar{z}$ is either the same as z, or different only by a translational constant along the z-axis.

It is, of course, feasible to map the above defined 'bent' coordinates onto an auxiliary Cartesian frame as a fourth system of coordinates which may perhaps be convenient for mathematical studies. Mapping between the polar system and the reference fourth Cartesian system may involve certain mathematical poles, but as long as the pivot point lies substantially outside of the annular area of transmission (12) of the rotatory surface, the mathematical pole present will not introduce singularities into the analytic nature of the functions within the useful transmitting area. Indeed, for an adjacent fixed element of a pair of optical elements of the invention, the clear aperture normally will remain circular as for any ordinary rotational surface. For the transmitting area of a rotatory element, the circular aperture spreads out into an annular area, or sectorized annulus, providing therefore adequate transmission however the element may be rotated through its full range as previously explained.

In the case where a pair of adjacent elements containing analytic shapes for the opposed surfaces are to be rotated, each has a transmitting area in the form of a sectorized annulus (see FIG. 2), and likely it is necessary for one to introduce a fixed circular defining aperture nearby as, for example, the circle 19 in Fig. 2. In any event, focusing or other optical action takes place when one of the two analytic shapes is rotated about the displaced pivot point, or points where two displaced axes of rotation are used, with respect to the other, or both with respect to the fixed circular aperture centered on the optical axis, OA, nearby. That is to say, in a more general case where both elements are rotatory, one may have a pivot point below for one element, as in FIG. 1, and a pivot point above for the other element (not shown), or both pivot points together but above or below, and similarly for other azimuths.

The differential geometry of the individual analytic shape can thus begin at the intersection of the optical axis, OA, with the analytic function surface, which is the adopted origin of coordinates, and owing to the complexities of any possibly closed analytic function, can instead be conveniently described by a power series in $\bar{x}$ and $\bar{y}$. Furthermore, total exactness of representation is not required and therefore the power series may be truncated to polynomial forms. As long as no pole or poles lie within the useful area of the sectorized annulus, there will be no mathematical singularity to deter, particularly because the inner bound is comprised of a concentric arc about the offending singularity at the pivot point. One can reasonably expect, however, that the accuracy of representation of the analytic shape of the surface by a truncated power series or polynomial in $\bar{x}$ and $\bar{y}$ depends mathematically on the relative proximity to the pole or singularity at the origin in the polar system, even though the latter lies entirely outside of the useful aperture. That is, one will find that some of the coefficients in terms of the parameters of the optical system will grow in magnitude according to the reciprocal distance to the external pole and powers thereof. In brief, one may say that an analytic function defining the shape of the deformed surface can be expressed in terms of a truncated power series or polynomial form to any desired precision as long as the function remains analytic within the useful aperture and as long as sufficient terms are used. Conversely, because of the existence of external poles, the corresponding analytic function shapes expressed in polar coordinates about such a pole become mathematical forms not readily recognizable as power series but which nevertheless adequately describe the shapes of the deformed surfaces. These mathematical forms in the polar frame of reference are also analytic and contain no poles, and in general will represent what is meant by referring to a working deformed surface as being of the shape of a preferred analytic function.

Because the relevant analytic expressions are without poles and continuous within the respective transmitting areas of the pairing of deformed surfaces, one fixed and the other variable in angle about the displaced axis, RA, a mathematical procedure can be adopted for representing the shape of each of the two surfaces, say $z_i(\bar{x}, \bar{y})$ and $z_{i+1}(\bar{x}/)$, in the form of a power series for each but with undetermined coefficients. A procedure then is established for the evaluation of all of these coefficients to any desired order, where at first all possible terms in power of $\bar{x}$ and $\bar{y}$ are present as will be seen hereinafter.

Figure 4:
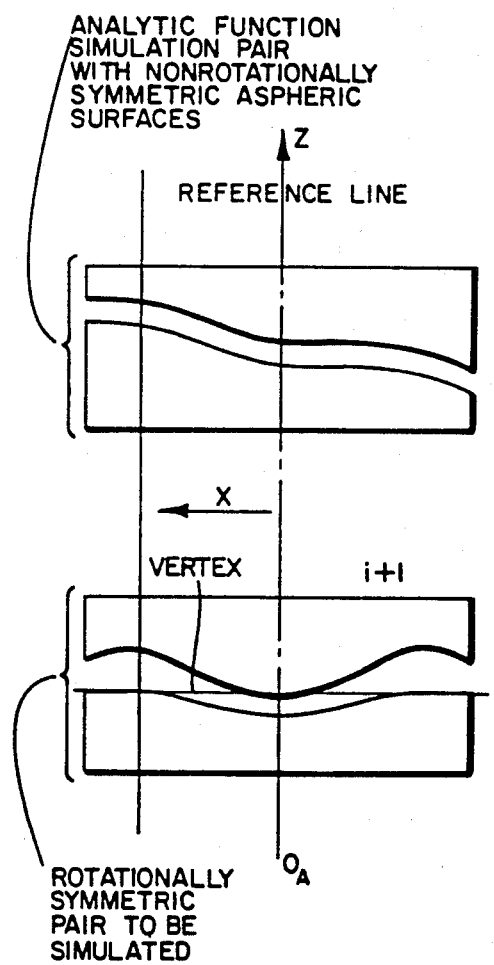
FIG. 4 is a diagrammatic cross-sectional view illustrating on the right a pair of elements of the invention and on the left a pair of rotationally symmetric dioptric elements which are simulated by the inventive elements.

However, before dealing with the mathematical procedure, it is important at this point to set forth an important goal of the invention which is the simulation of the optical action of a closely adjacent pair of rotational dioptric elements (see FIG. 4 on the left) with possible aspheric powers amongst the four surfaces, by the substitution of a closely adjacent pair of dioptric elements of analytic function form as shown on the right in FIG. 4. One of the simulating pair is to be rotatory about an eccentric pivot and have an outlying surface which is plane, the other which may be fixed has an outlying surface which may be of a rotational dioptric form with or without aspheric powers. Both these elements have inner opposed surfaces that are to take on the forms of analytic surfaces, and thereby perform the same optical action as the pair to be simulated, as nearly as possible. Furthermore, if for any given set of object distances, one finds a corresponding set of such closely adjacent rotational dioptric elements, optimized as may be desired for optical performance of an objective over the aperture, field and spectrum, the rotational dioptric elements varying not only in dioptric power but also in aspheric powers, distributed over their four surfaces in a preferred way, one must then substitute a rotatory motion of at least one of the inventive optical elements about a displaced pivot point and about an axis through the pivot point parallel to the optical axis, OA in order to vary both the equivalent dioptric and aspheric powers in simulation, as far as possible, of the optical action of the first set. At the same time the coefficients of the power terms must be evaluated for both the rotatory and fixed surfaces that will assist in optimizing the simulation. The target values of the first dioptric set to be simulated must be determined by the usual practices of optical design. The evaluation of the simulation, however, must proceed along mathematical lines.

A first step, then, is to carry through a detailed optical design of the desired system to be simulated for an adopted mean object distance, either central within the focusing range or decentered within the range to favor distant scenic photographs, or more rarely, to favor close-ups, according to the usage of a camera. This detailed design must be planned in advance, however, to incorporate at least one pair of adjacent surfaces intended to be ultimately of polynomial or analytic form, or at least inserted mathematically. If only one surface of the simulating pair is to be rotatable about a displaced axis, the simple element of which it is either the forward or rear surface must be at the start of plane form for its other surface, or else the polynomial form can be apportioned between the two sides. The rotatable surface is to become of analytic or polynomial form. The overall optical design may include, if found desirable, dioptric and aspheric powers on either or both of the inner-lying, opposed surfaces that are to become of analytic or polynomial form, and the outlying surface of the fixed element may have dioptric and aspheric powers, as may be required. In special cases, the erstwhile dioptric surface of the rotatable element may be transferred or apportioned onto the outlying surface of the fixed element which surface may already have predetermined dioptric and aspheric powers.

Referring now to FIG. 4, let us now consider a mathematical reference line in $\bar{x}$, $\bar{y}$ and $\bar{z}$ space that is drawn parallel to the optical axis at some assigned value of $\bar{x}$ and $\bar{y}$. Ths reference line will not be identical to any actual transmitted ray of light except at the optical axis, but is only a mathematical convenience in that any point on this line has the same values for $\bar{x}$ and $\bar{y}$, varying only in $\bar{z}$. An actual ray of light would instead be refracted by the successive surfaces of the adjacent simulating element pair, the inner opposed surfaces of which are to become deformed in a preferred way. While one might indeed use an actual ray of light as a reference, $\bar{x}$ and $\bar{y}$ would vary along the line segments between successive surfaces. Any power series development in $\bar{x}$, $\bar{y}$ and $\bar{z}$ would have coefficients of considerable and probably unnecessary complexity.

As a second step, therefore, it is expedient to make use of the reference line parallel to the axis and to calculate for the basic dioptric elements (on the left in FIG. 4) the total optical thickness along this reference line between the point of intercept on the first of the relevant four surfaces and the point of intercept on the last of the four surfaces. The optical thickness will in general consist of three line segments, two of which are in the media and the central one in air. The optical thickness along the reference line is the simple summation of the geometrical line-segments multiplied by the respective index of refraction. It is this optical thickness as a function of $\bar{x}$ and $\bar{y}$, calculated analytically for the dioptric basic system in which both elements are of rotational form about the optical axis, OA, that is to be reproduced by the summation of the geometrical line-segments along the same reference line, multiplied by the respective indices of refraction, where the inner-lying paired dioptric surfaces of the elements on the left in FIG. 4 are to be replaced by polynomial or more generally by analytic shapes.

If the media are identical for both elements, and if for convenience the outlying surfaces are provisionally plano, one may note that the line segment in air, that is, the central segment, must have the same geometrical length when the polynomial shapes are employed as when the basic rotational dioptric elements are used. All that happens is that the location of this air segment in $\bar{z}$ along the reference line shifts, but in such a way that an increased thickness along the reference line for one element is off-set by a decreased thickness for the other. The total optical thickness along the reference line is thus unchanged between the value for the basic or mean dioptric system to be simulated, and the substituted polynomial or analytic system in null or unrotated position that in principle simulates the basic dioptric system. It is this translational movement in the $\bar{z}$-direction, at any given value of $\bar{x}$ and $\bar{y}$ of the central air-segment between the original rotational dioptric elements and the simulating polynomial elements that comprises the crux of the entire procedure. Indeed, it is this flexibility in the $\bar{z}$-positioning of the air-segment that makes representation by the polynomial system both possible and useful.

Once analytic function expressions are found that accurately complete the simulation for a continuous array of radial distances from the optical axis, OA, being single valued for the rotational system, but double valued in $\bar{x}$ and $\bar{y}$ for the polynomial system, then it is easy to see that relatively small aberrations that affect the optical performance only slightly may be introduced by the change-over to the polynomial system. By way of illustration, it will be noted that the basic dioptric system already has certain residual image errors and distortion errors over the aperture, field and spectrum. The simulating polynomial system likely introduces further minute errors or aberrations caused by the necessary and inherent shift of any given air-segment along the $\bar{z}$-axis from its original and presumably optimum position.

However, when the air-segment is small, as is the case for closely adjacent surfaces, the new aberrations are also small, being primarily a slight side-stepping of the ray of light being refracted otherwise this way and that through the optical system. There are also somewhat smaller refractive errors caused by the prismatic differential changes along any given ray from slope errors at the points of intercept, as compared to the slopes of the basic dioptric surfaces to be simulated. These added-on aberrations in the polynomial or simulating system are relatively small for objectives of normal aperture, field and spectral coverage as for hand camera applications, and become important only for larger systems or for systems intended for the highest acuity. Finally, there are additional small aberrations caused by imperfections in the simulation between the analytic representation of the deformed surfaces and the rotational dioptric surfaces of the basic system to be simulated, caused principally by truncation of the power series representations.

The second step initiated above now is the algebraic task of representation of the dioptric total optical thickness by a power series in x and y which in the rotational space of the basic dioptric system expands into a power series containing $(x^2+y^2)$ to some power for all variable terms. The power expression commonly used takes the following form for a single rotational dioptric surface:

$$z = \frac{c(x^2 + y^2)}{1 + \sqrt{1 - (1 - e^2)c^2(x^2 + y^2)}} + \beta(x^2 + y^2)^2 + \ldots$$

where c denotes the vertex curvature of the particular dioptric surface and $\beta$ is the first aconic coefficient. The quantity $e^2$ is the eccentricity squared for the particular conic. For a spherical surface, both $e^2$ and $\beta$ are zero.

For purposes here the above expression can be further expanded into a Taylor series, as follows:

$$z = \tfrac{1}{2}c(x^2+y^2)+[\beta+\tfrac{1}{8}(1-e^2)c^3](x^2+y^2)^2+\ldots$$

If for the designation of the closely adjacent dioptric surfaces of the basic system one uses the subscripts $i$ and $(i+1)$, the geometrical length of the air-segment along the reference line (refer to FIG. 3) is simply the difference of two such power series in the following form:

$$(z_{i+1}-z_i)=\tfrac{1}{2}(c_{i+1}-c_i)(x^2+y^2)+(H_{i+1}-H_i)(x^2+y^2)^2+\ldots$$

where for convenience the quantity H is a shorthand for $$H_i = \beta_i + \tfrac{1}{8}(1-e^2)c^3_i$$

and similarly for $(i+1)$.

The polynomial surfaces on the other hand can be expanded in $\bar{x}$, $\bar{y}$ and $\bar{z}$ space as a generalized series, as mentioned earlier, and at the start can be given the following form:

$$\bar{z}_i = \sum_{j=0}^{n} \sum_{k=0}^{(n-j)} A_{ijk} \bar{x}^j \bar{y}^k$$

and similarly for $(i + 1)$.

As in the case of the air-segment for the rotational dioptric surfaces, the length of the geometrical air-segment for the polynomial case can be written as the simple difference of the z-values for the two closely adjacent surfaces plus the axial separation.

For the particular case where the displaced axis of rotation for the movable element is taken to be parallel to the optical axis, OA, the x, y and z terms and $\bar{x}$, $\bar{y}$ and $\bar{z}$ terms are related to the polar representation in the following way:

$$\bar{y} = r - a \qquad y = r\cos\phi - a$$
$$\bar{x} = r\phi \qquad x = r\sin\phi$$

Making use of these relationships, power series equivalences are then found between the x, y and z, and the $\bar{x}$, $\bar{y}$ and $\bar{z}$ spaces as follows:

$$x = \bar{x} - \frac{\bar{x}^3}{6(a+\bar{y})^2} + \ldots$$

$$y = \bar{y} - \frac{\bar{x}^2}{2(a+\bar{y})} + \frac{\bar{x}^4}{24(a+\bar{y})^3} - \ldots$$

These relationships can now be used to redefine the power series above for the rotational dioptric elements by transformation into the polynomial space, as for the general power series for the polynomial surfaces. Inasmuch as we are dealing not with the individual surface shapes but only with the differences, and indeed, in the simplest case, only with the geometrical length of the air-segment, one can now equate the power series term by term and thereby evaluate progressively all the previously unknown coefficients.

At this point certain terms can be eliminated or at least neglected because they are always zero, inasmuch as the equivalent terms in the transformed series for the rotational dioptric surfaces remain inherently zero. There are also other terms of no immediate import in that the geometrical length of the air-segment remains the same, whatever value is assigned. These are terms involving only the constant term $A_{i00}$ and terms involving only powers in $\bar{y}$ which remain unaffected by rotational changes described by $\bar{y}$ and therefore which subtract out in the differencing. Such terms may as well be assigned the value of zero and thereby eliminated. It may be, however, that judicious use of assigned finite values for such terms may allow for an easier fabrication of the polynomial surfaces according to the methods used. More importantly, such terms may be reintroduced in any later computerized optimization routines to effect possible improvements in performance. That is to say, the procedures made use of above are rendered tractable by the use of the reference line which one has taken to be parallel to the optical axis, OA. The exact optical situation is more complex. An optimization routine when properly performed will take into account any residual improvements with respect to aperture, field and spectrum, allowed by the use of non-zero or finite values of these special terms in $\bar{y}$ or powers of $\bar{y}$.

For the parallel case, it has been determined from the above procedures that the following relationships $A_{i00} = 0$ (or other assignable value)
$A_{i10} = 0$
$A_{i01} = 0$ (or other assignable value)

$A_{i20} = -\frac{1}{2}(c_{i+1} - c_i)$ $A_{i11} = 0$ $A_{i02} = -\frac{1}{2}(c_{i+1} - c_i) +$ an assignable value say $\Delta A_{i02}$ $A_{i30} = -\frac{1}{6}[(c'_{i+1} - c_{i+1}) - (c'_i - c_i)] \frac{1}{(a + \bar{y})\bar{\theta}}$ $A_{i21} = (c_{i+1} - c_i) \frac{1}{2(a + \bar{y})}$ $A_{i12} = -\frac{1}{2}[(c'_{i+1} - c_{i+1}) - (c'_i - c_i)] \frac{1}{(a + \bar{y})\bar{\theta}}$ $A_{i03} = 0$ (or other assignable value).

$A_{i40} = (c_{i+1} - c_i) \frac{1}{24(a + \bar{y})^2} - (H_{i+1} - H_i)$ $A_{i31} = \frac{1}{6}[(c'_{i+1} - c_{i+1}) - (c'_i - c_i)] \frac{1}{(a + \bar{y})^2 \bar{\theta}}$ $A_{i22} = -2(H_{i+1} - H_i)$
$A_{i13} = 0$
$A_{i04} = -(H_{i+1} - H_i)$ conveniently, $+$ an assignable value, say, $\Delta A_{i04}$ $A_{i50} = \frac{1}{120}[(c'_{i+1} - c_{i+1}) - (c'_i - c_i)] \frac{1}{(a + \bar{y})^3 \bar{\theta}}$ -continued $- \frac{1}{5}[(H'_{i+1} - H_{i+1}) - (H'_i - H_i)] \frac{1}{(a + \bar{y})\bar{\theta}}$ $A_{i41} = -(c_{i+1} - c_i) \frac{1}{24(a + \bar{y})^3} + (H_{i+1} - H_i) \frac{2}{(a + \bar{y})}$ $A_{i32} = -\frac{2}{3}[(H'_{i+1} - H_{i+1}) - (H'_i - H_i)] \frac{1}{(a + \bar{y})\bar{\theta}}$ $A_{i23} = (H_{i+1} - H_i) \frac{2}{(a + \bar{y})}$ $A_{i14} = -[(H'_{i+1} - H_{i+1}) - (H'_i - H_i)] \frac{1}{(a + \bar{y})\bar{\theta}}$ $A_{i05} = 0$ (or other assigned value)
$A_{i+1,00} = 0$ (or other assigned value $= A_{i,00}$)
$A_{i+1,10} = 0$
$A_{i+1,01} = 0$ (or other assigned value $= A_{i,01}$)
$A_{i+1,20} = 0$
$A_{i+1,11} = 0$
$A_{i+1,02} = 0 +$ an assigned value $= \Delta A_{i02}$ $A_{i+1,30} = -\frac{1}{6}[(c'_{i+1} - c_{i+1}) - (c_i - c_i)] \frac{1}{(a + \bar{y})\bar{\theta}}$ $A_{i+1,21} = 0$ $A_{i+1,12} = -\frac{1}{2}[(c'_{i+1} - c_{i+1}) - (c_i - c_i)] \frac{1}{(a + \bar{y})\bar{\theta}}$ $A_{i+1,03} = 0 +$ an assigned value $= A_{i03}$
$A_{i+1,40} = 0$ $A_{i+1,31} = \frac{1}{6}[(c'_{i+1} - c_{i+1}) - (c'_i - c_i)] \frac{1}{(a + \bar{y})^2 \bar{\theta}}$ $A_{i+1,22} = 0$
$A_{i+1,13} = 0$
$A_{i+1,04} = 0 +$ an assigned value $= \Delta A_{i04}$ $A_{i+1,50} = \frac{1}{120}[(c'_{i+1} - c_{i+1}) - (c'_i - c_i)] \frac{1}{(a + \bar{y})^3 \bar{\theta}}$ $- \frac{1}{5}[(H'_{i+1} - H_{i+1}) - (H'_i - H_i) \frac{1}{(a + \bar{y})\bar{\theta}}$ $A_{i+1,41} = 0$ $A_{i+1,32} = -\frac{2}{3}[(H'_{i+1} - H_{i+1}) - (H'_i - H_i) \frac{1}{(a + \bar{y})\bar{\theta}}$ $A_{i+1,23} = 0$ $A_{i+1,14} = -[(H'_{i+1} - H_{i+1}) - (H'_i - H_i)] \frac{1}{(a + \bar{y})\bar{\theta}}$ $A_{i+1,05} = 0 +$ an assigned value $= A_{i05}$ From these equivalences and from the tranformation expressions given above, the power series in $\bar{x}$, $\bar{y}$ and $\bar{z}$ space can be cast into polar representation in r and phi. The externally located pole in its multiple orders indicated by the transformation terms in reciprocals of $(a+\bar{y})$ and reciprocal powers of $(a+\bar{y})$ now are swallowed up in such a way that the coefficients in the r and phi polar system no longer contain poles. Indeed, the polar representation is no longer a fully complete power series, but by equivalence, at least through the order of the power series adopted, it does represent the same surface shape as obtained earlier from the analytic functions in $\bar{x}$ and $\bar{y}$. There is no less of accuracy in the transformation to the polar system not already inherent in the bent cartesian system. The polar expression now becomes:

$$\bar{z}_i = \sum_{j=0}^{n} \sum_{k=0}^{(n-j)} A_{ijk} r^j \phi^j (r-a)^k = z_i$$

and similarly for $\bar{z}_{i+1} = z_{i+1}$.

One notes that in the development of the expressions for the A's, the variable quantity $(a+\bar{y})$ appears in the denominator in various powers for a number of coefficients. The fact that such a term in $\bar{y}$ is variable upsets the nature of the power series in the normal representation. One can then develop any such reciprocal term into a separate power series in $\bar{y}$ and through series manipulations obtain augmented or adjusted new coefficients such as, say, $\bar{A}$'s. The convergence can be slow and hence one will be left with the situation that the polar representation will be somewhat more accurate than the readjusted power series truncated at an adopted level. This discrepancy will reappear in optimizations carried out in the x, y and z system and then transformed back again into the $\bar{x}$, $\bar{y}$ and $\bar{z}$ system or into the polar system. An optimization routine carried out in the polar system presumably in the long run will yield the best results. Representation of the optimum functional shape in the polar system will then contain no poles and will be accurate in accordance with the number of terms employed.

One can also transform the power series in $\bar{x}$ and $\bar{y}$ for the polynomial surfaces into a similar power series in x, y and z space in which the computer normally operates. In this instance, it will have been necessary beforehand to have expanded the reciprocals of $(a+\bar{y})$ in order for the results in the x, y, and z system to become a proper power series with non-variable coefficients, B's. For the case of the parallel displaced axis, one can arrive at the following expression through accuracy of the 4th order:

$$z_i = B_{i30}x^3 + B_{i12}xy^2 + B_{i31}x^3y + B_{i13}xy^3 + \ldots$$

where $$B_{i30} = -\frac{1}{6}[(c'_{i+1} - c_{i+1}) - (c'_i - c_i)]\frac{1}{a\theta}$$

$$B_{i12} = -\frac{1}{2}[(c'_{i+1} - c_{i+1}) - (c'_i - c_i)]\frac{1}{a\theta}$$

$$B_{i31} = -\frac{1}{6}[(c'_{i+1} - c_{i+1}) - (c'_i - c_i)]\frac{1}{a^2\theta}$$

$$B_{i13} = +\frac{1}{2}[(c'_{i+1} - c_{i+1}) - (c'_i - c_i)]\frac{1}{a^2\theta}$$

In the above expressions the factor $1/\theta$ appears at all points and $\theta$ is the angular rotation of the rotatable element about the displaced axis. For convenience, further terms involving $\theta^2$, $\theta^3$, etc. wherever they appear, are neglected, but only on the assumption that the angular value of $\theta$ is small. If indeed $\theta$ is small enough, the contribution of the higher order terms will be small, or can be partially off-set by computerized optizimation. In any event, if only the terms in $\theta$ are retained, the appearance of $\theta$ in the denominator, means that the designer can use a small value of $\theta$ thereby one can determine a relatively strongly deformed polynomial surface, or can use a larger value of $\theta$ for a weaker deformed surface, the latter endangering the performance because of the larger contributions of the higher order terms in powers of $\theta$.

For purposes of clarity, it is emphasized that $\theta$ and phi are in the same polar system. Phi as used above is a variable in polar coordinates used to define the actual stationary shape of the deformed surface in polar coordinates. $\theta$ the other hand, is the angular displacement of the pre-determined deformed shape for the movable or rotatable element. $\theta$ is the particular value of $\theta$ transforms the performance of the basic system for an assigned mean object distance to compensation in focus for movement of the object plane to some other distance, possibly to infinity.

Figure 5:
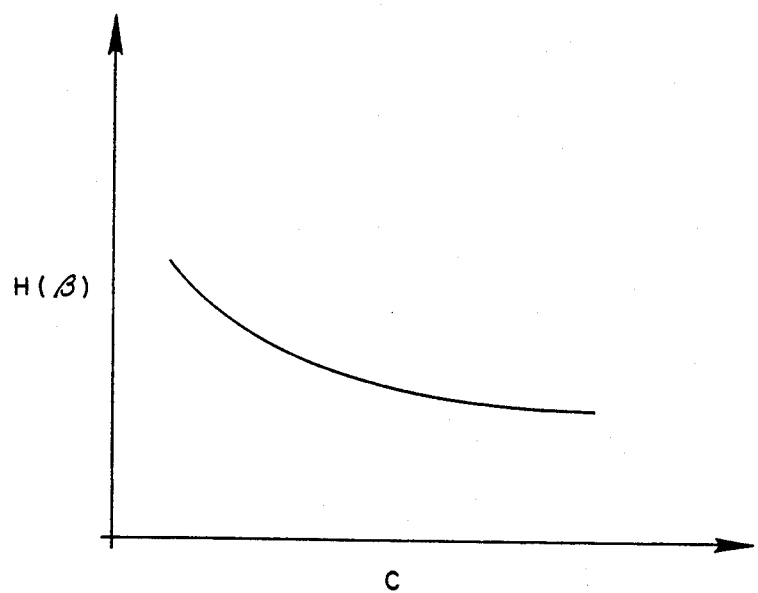
FIG. 5 is a diagrammatic plot of certain system related parameters.

It is to be noted that in the above equivalences between coefficients, values of c and H are also required for at least one outlying reciprocal object distance other than the mean. These may be evaluated for the rotational dioptric system at a second selected distance for the object plane, which conveniently may be for infinity. In practice, however, the target values of c and H can be evaluated for at least four object distances, one of which is infinity, and these values of H (or $\beta$, if for convenience $e^2 = 1.0$ in the evaluation) have been plotted against c. Most usually, a parabolic curve results, as shown in FIG. 5, whereas a linear relationship is actually desired. A straight line is then to be drawn in the best way possible through the parabola in which process the performance at two selected distances may be favored. The target values along the tilted straight line, which may be the re-evaluated H (or $\beta$) for infinity if that is used, are then employed in the evaluation of the equivalences. When all of this is completed, step 3 is complete.

A further step, if desired, may be performed by a computerized optimization routine, according to the quality of performance desired. In this process, an array of image points must be incorporated over the full field, inasmuch as no two images are alike, and the rotational relationships of the normal system become suppressed. There are also variations over the pupil that are non-rotational. The two patterns in aperture and field will in general lead to a much prolonged computational routine, as compared to the requirements of a purely rotational system. For convenience, therefore, the optimization may be satisfactorily performed in a mean wavelength with usually adequate precision. In an optical system requiring the utmost in performance, one may wish to re-introduce all the terms previously found to be zero, whether by convenience or by inherent nullity in a rotational system, which the deformed system no longer follows. The re-introduced quantities may also include the $\Delta A_{ijk}$. Indeed, all the possible terms in a matrix in x and y may be employed, but many will be small in magnitude. The computer burden may then be great.

A final step may be to recast the fully computer-optimized shapes in x and y back into the polar system. In this concluding transformation use should be made of the exact relationships of the transformations, point by point, in order to avoid inaccuracies re-introduced by inexact power series representation with but a reasonable number of terms. The final polar representation may be of value mostly for fabrication purposes, wherein the desired clear apertures of the fixed and of the movable surfaces are clearly set forth.

The essential form required for each of the analytic function surfaces of the invention to simulate the variable portion of the rotational dioptric system with one or more analytic function elements rotatable about a common pivot is given in the x, y, z coordinate system by:

$$z = K_1(xy^2 + \tfrac{1}{3}x^3) - K_2 x^3 y + K_3 xy^3$$

where $K_1$ is an assignable constant and $$K_2 = -\frac{1}{3a} K_1, \quad K_3 = -\frac{1}{a} K_1.$$

If the rotational system to be simulated includes rotational aspheres, then the essential form for each of the analytic functions defining the simulating surfaces becomes:

$$z = K_1(xy^2 + \tfrac{1}{3}x^3) - K_2 x^3 y + K_3 xy^3 + K_4 x^4 + K_5 x^2 y^2$$

where $K_1$ to $K_4$ are constants to be determined, and $K_5 = 2K_4$ plus residues conveniently set to zero.

From the foregoing considerations, a number of optical systems have been designed, and several of these will now be taken up as examples illustrating the inventive concept. The first three examples are presented in $\bar{x}, \bar{y}, \bar{z}$ coordinate system, while the last five are in the x,y,z coordinate system. All are suitable for use as variable focus photographic objectives and can be scaled for use at a focal length of 125 mm, have a speed of f/10 and an angular field coverage of 50-degrees total based on the format diagonal. Before presenting the examples in detail, however, an explanation of the notation used is appropriate.

The notation $f_d$ ordinarily refers to the equivalent focal length of an optical system in the wavelength d (587.6 nm), as defined paraxially for an object plane at infinity. (For an optical system having object and image space in the same medium, generally air, the f and f' of gaussian optics become equal). Thus, $f_d$ becomes the same as the equivalent focal length for d light, namely, the EFL.

If the mean object plane is at some assigned finite distance, the practice of using the symbol $\bar{f}_d$ to become a 'scale focal length' or more accurately, a scale factor, has been adopted. If this designated object distance is infinite, then $f_d$ and $\bar{f}_d$ become equal in the first instance and mean the same thing, namely, a scale focal length or EFL applied to objects at infinity. The quantity $\bar{f}_d$ as a scale factor can also be adapted to include distortion over a mean part of the field (calibrated focal length for infinity object).

Even if the symbol $\bar{f}_d$ applies for an assigned mean object distance, the optical system will also have the usual $f_d$ of gaussian optics, where for mathematical purposes the object plane is shifted temporarily to infinity. For the type of focusing being done here, $f_d$ is used for a fixed and assigned position of the image plane, and $f_d$ for the concomitant but ever changing system, while obtainable, is not actually being used in the picture-taking process.

The meaning of all coefficients, whether for rotational or non-rotational surfaces, has been explained previously in the specification and will not be repeated here. All values have been normalized with respect to $\bar{f}_d$.

Figure 6:
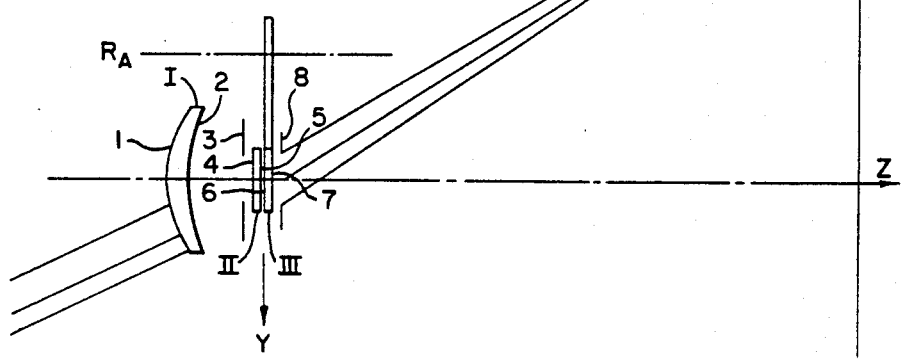
FIGS. 6-11 are diagrammatic plan views of optical systems embodying the present invention.

The first example is a pair of analytic function elements combined with an objective as shown in FIG. 6. The constructional data in tabular form is as follows:

| Element Number | Surface | Radii | Separations Plastic | Separations Air | Clear Apertures | Material |
|---|---|---|---|---|---|---|
| I | 1 | 0.1776 | 0.0286 | | 0.200 | Plexi |
| | 2 | 0.2707* | | 0.0741 | 0.185 | |
| | 3 | stop | | 0.0122 | 0.085 | diaphragm |
| II | 4 | −2.284* | 0.0131 | | 0.111 | Polycarbonate |
| | 5 | plano** | | 0.0019 | 0.105 | |
| III | 6 | 2.186** | 0.0131 | | 0.103 | Polycarbonate |
| | 7 | plano | | 0.0110 | 0.096 | |
| | 8 | stop | | 0.8230 # | 0.083 | Iris & Shutter |

*Aspheric (rotational)
**Polynomial (non-rotational)Radius given is simulated for the mean object distance.
Back focal distance ($d_e$)
$\bar{f}_d = 1.0000$
$s_1$ (adopted mean object distance) = 20.96
$\bar{f}_d/10.0$ When one refocuses for infinite object distance by use of a decentered transverse rotation of Element III by an angular value of $\theta$, one finds that $f_d = 0.9983$ ($d_e$ held constant).

The rotational coefficients are as follows:

| | | | |
|---|---|---|---|
| Beta$_2$ = | 1.754 × 10° | Beta$_4$ = | −1.528 × 10$^1$ |
| Gamma$_2$ = | 7.031 × 10$^{-3}$ | Gamma$_4$ = | −2.862 × 10$^{-2}$ |
| Delta$_2$ = | −1.750 × 10$^{-7}$ | Delta$_4$ = | −4.491 × 10$^{-9}$ |

Element II with its rear surface polynomial is fixed (no rotation). Element III with its forward surface polynomial rotates about an assigned displaced center with the transversely displaced axis parallel to the optical axis.
The rotational coefficients are given by:

| | | | |
|---|---|---|---|
| A$_{520}$ = | −2.288 × 10$^{-1}$ | A$_{620}$ = | 0 |
| A$_{502}$ = | −2.288 × 10$^{-1}$ | A$_{602}$ = | 0 |
| A$_{530}$ = | 1.861 × 10$^{-2}/\theta$ | A$_{630}$ = | 1.861 × 10$^{-2}/\theta$ |
| A$_{521}$ = | 2.288 × 10$^{-1}$ | A$_{621}$ = | 0 |
| A$_{512}$ = | 5.584 × 10$^{-2}/\theta$ | A$_{612}$ = | 5.584 × 10$^{-2}/\theta$ |
| A'$_{540}$ = | 1.906 × 10$^{-2}$ | A'$_{640}$ = | 0 |
| A$_{540}$ = | −1.059 × 10$^{-2}$ | A$_{640}$ = | 0 |
| A$_{531}$ = | −1.861 × 10$^{-2}/\theta$ | A$_{631}$ = | −1.861 × 10$^{-2}/\theta$ |
| A$_{522}$ = | −2.118 × 10$^{-2}$ | A$_{622}$ = | 0 |
| A$_{504}$ = | −1.059 × 10$^{-2}$ | A$_{604}$ = | 0 |
| A'$_{550}$ = | −9.307 × 10$^{-4}/\theta$ | A'$_{650}$ = | −9.307 × 10$^{-4}/\theta$ |
| A$_{550}$ = | 1.285 × 10$^{-3}/\theta$ | A$_{650}$ = | 1.285 × 10$^{-3}/\theta$ |
| A'$_{541}$ = | −1.906 × 10$^{-2}$ | A'$_{641}$ = | 0 |
| A$_{541}$ = | 2.118 × 10$^{-2}$ | A$_{641}$ = | 0 |
| A$_{532}$ = | 4.282 × 10$^{-3}/\theta$ | A$_{632}$ = | 4.282 × 10$^{-3}/\theta$ |
| A$_{523}$ = | 2.118 × 10$^{-2}$ | A$_{623}$ = | 0 |
| A$_{514}$ = | 6.423 × 10$^{-3}/\theta$ | A$_{614}$ = | 6.423 × 10$^{-3}/\theta$ |

Where a prime (') is used to distinguish A-terms with two parts.

Figure 7:
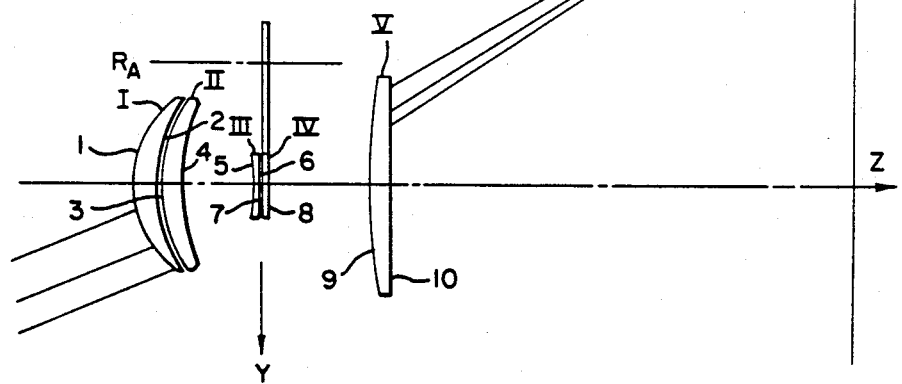

The second example is a pair of analytic function elements combined with three elements as shown in FIG. 7. Constructional data is as follows:

| Element Number | Surface | Radii | Separations Plastic | Separations Air | Clear Apertures | Material |
|---|---|---|---|---|---|---|
| I | 1 | 0.1147 | 0.0242 | | 0.196 | Plexi |
| | 2 | 0.1502* | | 0.0004 | 0.192 | |
| II | 3 | 0.1339 | 0.0240 | | 0.185 | Plexi |
| | 4 | 0.1747 | | 0.0792 | 0.171 | |
| III | 5 | −0.2815* | 0.0054 | | 0.071 | Poly-carbonate |
| | 6 | plano** | | 0.0004 | 0.066 | |
| IV | 7 | plano** | 0.0054 | | 0.066 | Poly-carbonate |
| | 8 | plano | | 0.1228 | 0.070 | |
| V | 9 | 1.0063* | 0.0205 | | 0.250 | Poly-carbonate |
| | 10 | 4.511 | | 0.5565# | 0.257 | |

*Aspheric (rotational)
Back focal distance ($d_F$)
**Polynominal (non-rotational); Radii given are as simulated for the mean object distance.
$\bar{f}_d = 1.0000$
$s_1$ (adopted mean object distance) = 13.55
$\bar{f}_d/10.1$ When one refocuses for infinite object distance by use of a decentered transverse rotation of Element IV by an angular value of $\theta$, one finds that $$f_d = 0.9987 \ (d_F \text{ held constant})$$

Coefficients for rotational surfaces are as follows:

| | | | | | |
|---|---|---|---|---|---|
| $Beta_2 =$ | $-1.412 \times 10^1$ | $Beta_5 =$ | $-1.736 \times 10^2$ | $Beta_9 =$ | $9.233 \times 10^0$ |
| $Gamma_2 =$ | $-9.123 \times 10^{-3}$ | $Gamma_5 =$ | $-1.892 \times 10^{-2}$ | $Gamma_9 =$ | $-9.670 \times 10^0$ |
| $Delta_2 =$ | $-1.892 \times 10^{-4}$ | $Delta_5 =$ | $-4.442 \times 10^{-5}$ | $Delta_9 =$ | $-1.695 \times 10^{-1}$ |

Element III with its rear surface polynomial is fixed (no rotation). Element IV with its forward surface polynomial rotates about an assigned displaced center with the transversely displaced axis parallel to the optical axis.

| | | | |
|---|---|---|---|
| $A_{620} =$ | 0 | $A_{720} =$ | 0 |
| $A_{602} =$ | 0 | $A_{702} =$ | 0 |
| $A_{630} =$ | $4.519 \times 10^{-2}/\bar{\theta}$ | $A_{730} =$ | $4.519 \times 10^{-2}/\bar{\theta}$ |
| $A_{621} =$ | 0 | $A_{721} =$ | 0 |
| $A_{612} =$ | $1.356 \times 10^{-1}/\bar{\theta}$ | $A_{712} =$ | $1.356 \times 10^{-1}/\bar{\theta}$ |
| $A'_{640} =$ | 0 | $A'_{740} =$ | 0 |
| $A_{640} =$ | 0 | $A_{740} =$ | 0 |
| $A_{631} =$ | $-4.519 \times 10^{-2}/\bar{\theta}$ | $A_{731} =$ | $-4.519 \times 10^{-2}/\bar{\theta}$ |
| $A_{622} =$ | 0 | $A_{722} =$ | 0 |
| $A_{604} =$ | 0 | $A_{704} =$ | 0 |
| $A'_{650} =$ | $-2.259 \times 10^{-3}/\bar{\theta}$ | $A'_{750} =$ | $-2.259 \times 10^{-3}/\bar{\theta}$ |
| $A_{650} =$ | $-3.234 \times 10^{-1}/\bar{\theta}$ | $A_{750} =$ | $-3.234 \times 10^{-1}/\bar{\theta}$ |
| $A'_{641} =$ | 0 | $A'_{741} =$ | 0 |
| $A_{641} =$ | 0 | $A_{741} =$ | 0 |
| $A_{632} =$ | $-1.078 \times 10^0/\bar{\theta}$ | $A_{732} =$ | $-1.078 \times 10^0/\bar{\theta}$ |
| $A_{623} =$ | 0 | $A_{723} =$ | 0 |
| $A_{614} =$ | $-1.617 \times 10^0/\bar{\theta}$ | $A_{714} =$ | $-1.617 \times 10^0/\bar{\theta}$ |

Where a prime (') is used to distinguish A-terms with two parts.

Figure 8:
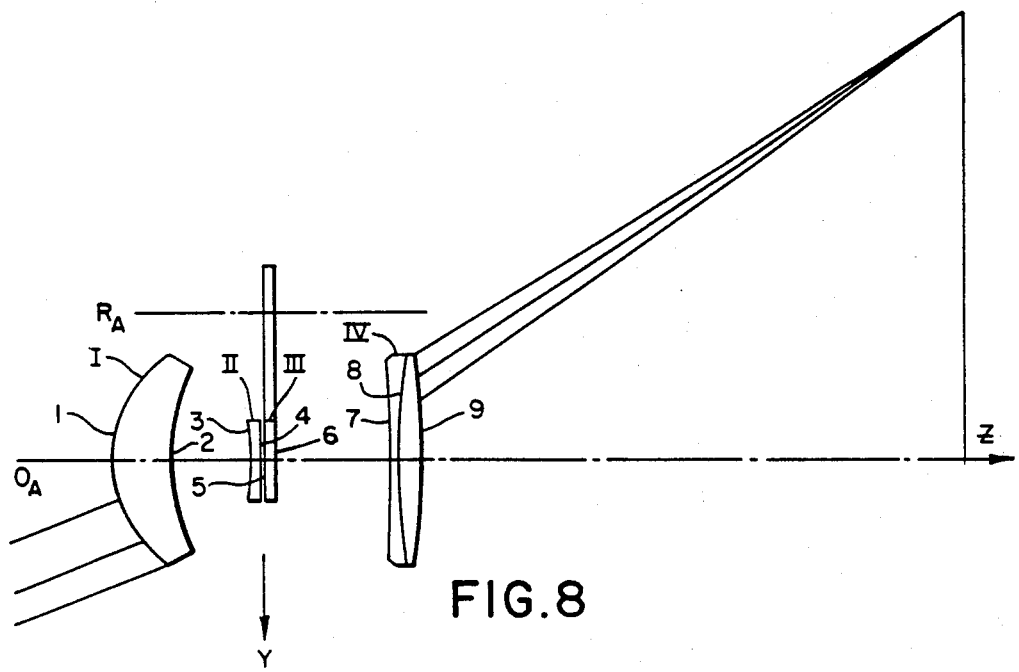

The third example, and last in the $\bar{x}, \bar{y}, \bar{z}$ system, is a pair of analytic function elements combined with three elements as shown in FIG. 8. Constructional data is:

| Element Number | Surface | Radii | Separations Plastic | Separations Air | Clear Apertures | Material |
|---|---|---|---|---|---|---|
| I | 1 | 0.1183 | 0.0573 | | 0.200 | Plexi |
| | 2 | 0.2227* | | 0.0767 | 0.175 | |
| II | 3 | −0.2675* | 0.0097 | | 0.077 | Poly-carbonate |
| | 4 | plano** | | 0.0004 | 0.073 | |
| III | 5 | plano** | 0.0097 | | 0.073 | Poly-carbonate |
| | 6 | plano | | 0.1066 | 0.077 | |
| IV | 7 | −2.405 | 0.0103 | | 0.209 | Plexi |
| | 8 | 0.9195 | 0.0206 | | 0.220 | Poly-carbonate |
| | 9 | −1.0332* | | 0.5570# | 0.220 | |

*Aspheric (rotational)
Back focal distance ($d_e$)
**Polynominal (non-rotational); Radii given are as simulated for the mean object distance.
$\bar{f}_d = 1.0000$
$s_1$ (adopted mean object distance) = 13.61
$\bar{f}_d/10.0$ When one refocuses for infinite object distance by use of a decentered transverse rotation of Element III by an angular value of 0, one finds that
$f_d = 0.9996 \ (d_e \text{ held constant})$ Rotational coefficients are:

| | | | | | |
|---|---|---|---|---|---|
| $Beta_2 =$ | $-2.095 \times 10^1$ | $Beta_3 =$ | $-1.642 \times 10^2$ | $Beta_9 =$ | $-1.216 \times 10^1$ |
| $Gamma_2 =$ | $-4.388 \times 10^{-1}$ | $Gamma_3 =$ | $1.561 \times 10^{-1}$ | $Gamma_9 =$ | $7.548 \times 10^1$ |
| $Delta_2 =$ | $-8.500 \times 10^{-3}$ | $Delta_3 =$ | $-1.271 \times 10^{-4}$ | $Delta_9 =$ | $3.789 \times 10^0$ |
| $Epsilon_2 =$ | $-8.876 \times 10^{-5}$ | $Epsilon_3 =$ | 0 | $Epsilon_9 =$ | $1.539 \times 10^{-1}$ |

Element II with its rear surface polynomial is fixed (no rotation). Element III with its forward surface polynomial rotates about an assigned displaced center with the transversely diplaced axis parallel to the optical axis.

Non-rotational coefficients are as follows:

| | | | |
|---|---|---|---|
| $A_{420} =$ | 0 | $A_{520} =$ | 0 |
| $A_{402} =$ | 0 | $A_{502} =$ | 0 |
| $A_{430} =$ | $4.739 \times 10^{-2}/\bar{\theta}$ | $A_{530} =$ | $4.739 \times 10^{-2}/\bar{\theta}$ |
| $A_{421} =$ | 0 | $A_{521} =$ | 0 |
| $A_{412} =$ | $1.422 \times 10^{-1}/\bar{\theta}$ | $A_{512} =$ | $1.422 \times 10^{-1}/\bar{\theta}$ |
| $A'_{440} =$ | 0 | $A'_{540} =$ | 0 |
| $A_{440} =$ | $0.743 \times 10^0$ | $A_{540} =$ | 0 |
| $A_{431} =$ | $-4.739 \times 10^{-2}/\bar{\theta}$ | $A_{531} =$ | $-4.739 \times 10^{-2}/\bar{\theta}$ |
| $A_{422} =$ | $1.487 \times 10^0$ | $A_{522} =$ | 0 |
| $A_{404} =$ | $0.743 \times 10^0$ | $A_{504} =$ | 0 |
| $A'_{450} =$ | $-2.370 \times 10^{-3}/\bar{\theta}$ | $A'_{550} =$ | $-2.370 \times 10^{-3}/\bar{\theta}$ |
| $A_{450} =$ | $-1.487 \times 10^{-1}/\bar{\theta}$ | $A_{550} =$ | $-1.487 \times 10^{-1}/\bar{\theta}$ |
| $A'_{441} =$ | 0 | $A'_{541} =$ | 0 |
| $A_{441} =$ | $-1.487 \times 10^0$ | $A_{541} =$ | 0 |
| $A_{432} =$ | $-4.955 \times 10^{-1}/\bar{\theta}$ | $A_{532} =$ | $-4.955 \times 10^{-1}/\bar{\theta}$ |
| $A_{423} =$ | $-1.487 \times 10^0$ | $A_{523} =$ | 0 |
| $A_{414} =$ | $-7.433 \times 10^{-1}/\bar{\theta}$ | $A_{514} =$ | $-7.433 \times 10^{-1}/\bar{\theta}$ |

Where a prime (') is used to distinguish A-terms with two parts.

Figure 9:
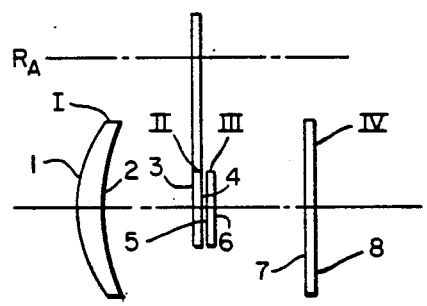

The next three examples, all in the x,y,z system (with the pivot point lying in the +x-axis), show a pair of analytic function elements combined with two other elements as shown in FIG. 9. These three examples, the 4th, 5th and 6th in sequence, differ from one another in the value of their non-rotational coefficients, but otherwise share the same base system as given by the following constructional data:

| BASE SYSTEM FOR 4th, 5th AND 6th EXAMPLES | | | | | |
|---|---|---|---|---|---|
| Element | | | Separations | Clear | |
| No. | Surface | Radii | Plastic | Air | Apertures | Material |
| 1 | 1 | 0.1498 | 0.0426 | | 0.201 | Plexi |
| | 2 | 0.1890* | | 0.0856 | 0.172 | |
| 2 | 3 | plano** | 0.0120 | | 0.094 | Plexi |
| | 4 | base** | | 0.0122 | — | |
| 3 | 5 | base** | 0.0120 | | 0.081 | Plexi |
| | 6 | −0.0235* | | 0.1073 | 0.084 | |
| 4 | 7 | 0.05742 | 0.0122 | | 0.193 | Polystyrene |
| | 8 | plano | | 0.6813# | 0.200 | |

*Rotational Aspherics
**Non-rotational (Polynomial) according to QF number
Back focal distance
$\bar{f}_d = 0.9843$
$s_1$ (adopted mean object distance) = 16.76
$\bar{f}_d/10.0$ Rotational surface coefficients are:

| | | | | | |
|---|---|---|---|---|---|
| $beta_2 =$ | $1.003 \times 10^1$ | $beta_6 =$ | $-1.434 \times 10^0$ | $beta_7 =$ | $2.637 \times 10^0$ |
| $gamma_2 =$ | $-6.781 \times 10^0$ | $gamma_6 =$ | $-3.274 \times 10^{-2}$ | $gamma_7 =$ | $1.084 \times 10^1$ |
| $delta_2 =$ | $1.485 \times 10^{-3}$ | $delta_6 =$ | $-1.099 \times 10^{-4}$ | $delta_7 =$ | $1.192 \times 10^{-1}$ |
| $epsilon_2 =$ | $1.624 \times 10^{-5}$ | $epsilon_6 =$ | $-2.970 \times 10^{-7}$ | $epsilon_7 =$ | $1.233 \times 10^{-3}$ |

Surfaces 4 and 5 are th principal polynomial surfaces and have coefficient values to be disignated.

The values of the non-rotational coefficients for a fourth example to be used with the base system description above add applied to surfaces 4 and 5 are as follows:

| 4th EXAMPLE NON-ROTATIONAL COEFFICIENTS | | | |
|---|---|---|---|
| Rotatable Surface 4 | | Fixed Surface 5 | |
| Coefficient | Value | Coefficient | Value |
| $B_{420} =$ | $0.17635 \times 10+00$ | $B_{520} =$ | $0.33621 \times 10+00$ |
| $B_{411} =$ | $0.82193 \times 10-01$ | $B_{511} =$ | $0.83311 \times 10-01$ |
| $B_{402} =$ | $0.17116 \times 10+00$ | $B_{502} =$ | $0.33073 \times 10+00$ |
| $B_{430} =$ | $0.96509 \times 10+00$ | $B_{530} =$ | $0.97725 \times 10+00$ |
| $B_{421} =$ | $-0.14963 \times 10+00$ | $B_{521} =$ | $-0.17296 \times 10-01$ |
| $B_{412} =$ | $0.14764 \times 10+01$ | $B_{512} =$ | $0.15668 \times 10+01$ |
| $B_{403} =$ | $-0.28982 \times 10+00$ | $B_{503} =$ | $-0.25311 \times 10+00$ |
| $B_{440} =$ | $0.84407 \times 10-01$ | $B_{540} =$ | $-0.26381 \times 10+02$ |
| $B_{431} =$ | $-0.14376 \times 10+01$ | $B_{531} =$ | $-0.10465 \times 10+01$ |
| $B_{422} =$ | $-0.38025 \times 10+01$ | $B_{522} =$ | $-0.56745 \times 10+02$ |
| $B_{413} =$ | $-0.45028 \times 10+01$ | $B_{513} =$ | $-0.57384 \times 10+01$ |
| $B_{404} =$ | $0.14459 \times 10+00$ | $B_{504} =$ | $-0.26319 \times 10+02$ |
| $B_{450} =$ | $-0.17390 \times 10+01$ | $B_{550} =$ | $-0.66473 \times 10+01$ |
| $B_{441} =$ | $0.15724 \times 10+02$ | $B_{541} =$ | $0.16305 \times 10+02$ |
| $B_{432} =$ | $-0.98287 \times 10+02$ | $B_{532} =$ | $-0.10847 \times 10+03$ |
| $B_{423} =$ | $-0.15961 \times 10+02$ | $B_{523} =$ | $-0.16436 \times 10+02$ |
| $B_{414} =$ | $0.74777 \times 10+02$ | $B_{514} =$ | $0.50115 \times 10+02$ |
| $B_{405} =$ | $0.25328 \times 10+02$ | $B_{505} =$ | $0.22133 \times 10+02$ |
| $B_{460} =$ | $0.96561 \times 10-02$ | $B_{560} =$ | $0.27799 \times 10-01$ |
| $B_{451} =$ | $-0.23303 \times 10+00$ | $B_{551} =$ | $-0.23307 \times 10+00$ |
| $B_{442} =$ | $-0.12419 \times 10-01$ | $B_{542} =$ | $0.42022 \times 10-01$ |
| $B_{433} =$ | $0.13407 \times 10+00$ | $B_{533} =$ | $0.13409 \times 10+00$ |
| $B_{424} =$ | $0.48734 \times 10-02$ | $B_{524} =$ | $0.59314 \times 10-01$ |
| $B_{415} =$ | $0.53554 \times 10-01$ | $B_{515} =$ | $0.53576 \times 10-01$ |
| $B_{406} =$ | $0.99630 \times 10-03$ | $B_{506} =$ | $0.19145 \times 10-01$ |
| $B_{470} =$ | $0.11685 \times 10+00$ | $B_{570} =$ | $0.11238 \times 10+00$ |
| $B_{461} =$ | $0.12315 \times 10+01$ | $B_{561} =$ | $0.12325 \times 10+01$ |
| $B_{452} =$ | $0.10226 \times 10+02$ | $B_{552} =$ | $0.10245 \times 10+02$ |
| $B_{443} =$ | $0.15969 \times 10+00$ | $B_{543} =$ | $0.15946 \times 10+00$ |
| $B_{434} =$ | $-0.26285 \times 10+01$ | $B_{534} =$ | $-0.26229 \times 10+01$ |
| $B_{425} =$ | $-0.25506 \times 10+00$ | $B_{525} =$ | $-0.25555 \times 10+00$ |
| $B_{416} =$ | $-0.27879 \times 10+01$ | $B_{516} =$ | $-0.28238 \times 10+01$ |

-continued

| 4th EXAMPLE NON-ROTATIONAL COEFFICIENTS | | | |
|---|---|---|---|
| Rotatable Surface 4 | | Fixed Surface 5 | |
| Coefficient | Value | Coefficient | Value |
| $B_{407} =$ | $-0.68930 \times 10+00$ | $B_{507} =$ | $-0.70525 \times 10+00$ |
| | | $B_{580} =$ | $0.12113 \times 10-02$ |
| | | $B_{562} =$ | $-0.43173 \times 10-04$ |
| | | $B_{544} =$ | $0.36196 \times 10-03$ |
| | | $B_{526} =$ | $0.28940 \times 10-03$ |
| | | $B_{508} =$ | $0.10176 \times 10-03$ |

This example focuses from infinity to approximately 25 inches with an offset distance of 0.570 inch for rotating element II.

Values for the non-rotational surface coefficients for a 5th system example are as follows:

| 5th EXAMPLE NON-ROTATIONAL COEFFICIENTS | | | |
|---|---|---|---|
| Rotatable Surface 4 | | Fixed Surface 5 | |
| Coefficient | Value | Coefficient | Value |
| $B_{420} =$ | $0.31745 \times 10+00$ | $B_{520} =$ | $0.49309 \times 10+00$ |
| $B_{411} =$ | $0.19416 \times 10-01$ | $B_{511} =$ | $0.20374 \times 10-01$ |
| $B_{402} =$ | $0.31725 \times 10+00$ | $B_{502} =$ | $0.49261 \times 10+00$ |
| $B_{430} =$ | $0.73235 \times 10+00$ | $B_{530} =$ | $0.76828 \times 10+00$ |
| $B_{421} =$ | $-0.82315 \times 10-01$ | $B_{521} =$ | $-0.95244 \times 10-01$ |
| $B_{412} =$ | $0.22562 \times 10+01$ | $B_{512} =$ | $0.23585 \times 10+01$ |
| $B_{403} =$ | $-0.37735 \times 10+00$ | $B_{503} =$ | $-0.38551 \times 10+00$ |
| $B_{440} =$ | $-0.25889 \times 10-01$ | $B_{540} =$ | $-0.26488 \times 10+02$ |
| $B_{431} =$ | $0.88754 \times 10+00$ | $B_{531} =$ | $0.13355 \times 10+01$ |
| $B_{422} =$ | $-0.27066 \times 10+01$ | $B_{522} =$ | $-0.55631 \times 10+02$ |
| $B_{413} =$ | $-0.46913 \times 10+01$ | $B_{513} =$ | $-0.60622 \times 10+01$ |
| $B_{404} =$ | $-0.31827 \times 10+00$ | $B_{504} =$ | $-0.26780 \times 10+02$ |
| $B_{450} =$ | $0.17938 \times 10+02$ | $B_{550} =$ | $0.15100 \times 10+02$ |
| $B_{441} =$ | $0.63013 \times 10+01$ | $B_{541} =$ | $0.63070 \times 10+01$ |
| $B_{432} =$ | $-0.22539 \times 10+01$ | $B_{532} =$ | $-0.25300 \times 10+03$ |
| $B_{423} =$ | $-0.19065 \times 10+01$ | $B_{523} =$ | $-0.19098 \times 10+01$ |
| $B_{414} =$ | $0.26757 \times 10+03$ | $B_{514} =$ | $0.26215 \times 10+03$ |
| $B_{405} =$ | $-0.63023 \times 10+01$ | $B_{505} =$ | $-0.62411 \times 10+01$ |
| $B_{460} =$ | $0.32409 \times 10-02$ | $B_{560} =$ | $0.21386 \times 10-01$ |
| $B_{451} =$ | $-0.18306 \times 10+00$ | $B_{551} =$ | $-0.18308 \times 10+00$ |
| $B_{442} =$ | $-0.27969 \times 10-02$ | $B_{542} =$ | $0.51649 \times 10-01$ |
| $B_{433} =$ | $0.13301 \times 10+00$ | $B_{533} =$ | $0.13301 \times 10+00$ |
| $B_{424} =$ | $0.92066 \times 10-03$ | $B_{524} =$ | $0.55366 \times 10-01$ |
| $B_{415} =$ | $0.47979 \times 10-01$ | $B_{515} =$ | $0.47988 \times 10-01$ |
| $B_{406} =$ | $0.22130 \times 10-03$ | $B_{506} =$ | $0.18370 \times 10-01$ |
| | | $B_{580} =$ | $0.57177 \times 10-04$ |
| | | $B_{562} =$ | $0.22871 \times 10-03$ |

-continued

5th EXAMPLE NON-ROTATIONAL COEFFICIENTS

| Rotatable Surface 4 | | Fixed Surface 5 | |
|---|---|---|---|
| Coefficient | Value | Coefficient | Value |
| | | $B_{544} =$ | $0.34306 \times 10-03$ |
| | | $B_{526} =$ | $0.22871 \times 10-03$ |
| | | $B_{508} =$ | $0.57177 \times 10-04$ |

With these coefficients for surfaces 4 and 5, the base system of FIG. 9 is focusable from infinity to approximately 26 inches with a point distance of 0.6 inches and an angular excursion of the rotatable element of approximately 50° along the arc between center points of the outlying apertures.

The value of the non-rotational coefficients for the 6th example, again referenced to FIG. 9 and the above base system, are as follows:

6th EXAMPLE NON-ROTATIONAL COEFFICIENTS

| Rotatable Surface 4 | | Fixed Surface 5 | |
|---|---|---|---|
| Coefficient | Value | Coefficient | Value |
| $B_{420} =$ | $0.46600 \times 10+00$ | $B_{520} =$ | $0.62957 \times 10+00$ |
| $B_{411} =$ | $0.77017 \times 10-01$ | $B_{511} =$ | $0.78618 \times 10-01$ |
| $B_{402} =$ | $0.46026 \times 10+00$ | $B_{502} =$ | $0.62204 \times 10+00$ |
| $B_{430} =$ | $0.11176 \times 10+01$ | $B_{530} =$ | $0.11489 \times 10+01$ |
| $B_{421} =$ | $-0.82694 \times 10-01$ | $B_{521} =$ | $-0.91447 \times 10-01$ |
| $B_{412} =$ | $0.24534 \times 10+01$ | $B_{512} =$ | $0.25386 \times 10+01$ |
| $B_{403} =$ | $0.55940 \times 10-01$ | $B_{503} =$ | $0.53522 \times 10-01$ |
| $B_{440} =$ | $0.56821 \times 10-01$ | $B_{540} =$ | $0.26405 \times 10+02$ |
| $B_{431} =$ | $0.21750 \times 10+01$ | $B_{531} =$ | $0.25840 \times 10+01$ |
| $B_{422} =$ | $-0.49442 \times 10+01$ | $B_{522} =$ | $-0.57886 \times 10+02$ |
| $B_{413} =$ | $-0.69085 \times 10+01$ | $B_{513} =$ | $-0.81771 \times 10+01$ |
| $B_{404} =$ | $-0.93669 \times 10-01$ | $B_{504} =$ | $-0.26554 \times 10+02$ |
| $B_{450} =$ | $0.54783 \times 10+01$ | $B_{550} =$ | $0.24635 \times 10+01$ |
| $B_{441} =$ | $0.11101 \times 10+02$ | $B_{541} =$ | $0.11114 \times 10+02$ |
| $B_{432} =$ | $-0.18539 \times 10+03$ | $B_{532} =$ | $-0.21302 \times 10+03$ |
| $B_{423} =$ | $-0.56624 \times 10+01$ | $B_{523} =$ | $-0.56598 \times 10+01$ |
| $B_{414} =$ | $0.25269 \times 10+03$ | $B_{514} =$ | $0.24719 \times 10+03$ |
| $B_{405} =$ | $-0.12350 \times 10+02$ | $B_{505} =$ | $-0.12256 \times 10+02$ |
| $B_{460} =$ | $0.42151 \times 10-02$ | $B_{560} =$ | $0.22366 \times 10-01$ |
| $B_{451} =$ | $-0.18961 \times 10+00$ | $B_{551} =$ | $-0.18964 \times 10+00$ |
| $B_{442} =$ | $-0.10823 \times 10-01$ | $B_{542} =$ | $0.43619 \times 10-01$ |
| $B_{433} =$ | $0.13247 \times 10+00$ | $B_{533} =$ | $0.13249 \times 10+00$ |
| $B_{424} =$ | $0.18329 \times 10-02$ | $B_{524} =$ | $0.56275 \times 10-01$ |
| $B_{415} =$ | $0.48690 \times 10-01$ | $B_{515} =$ | $0.48709 \times 10-01$ |
| $B_{406} =$ | $0.36013 \times 10-03$ | $B_{506} =$ | $0.18510 \times 10-01$ |
| | | $B_{580} =$ | $0.57177 \times 10-04$ |
| | | $B_{562} =$ | $0.22871 \times 10-03$ |
| | | $B_{544} =$ | $0.34306 \times 10-03$ |
| | | $B_{526} =$ | $0.22871 \times 10-03$ |
| | | $B_{508} =$ | $0.57177 \times 10-04$ |

The system also focuses down to approximately 26 inches, but with a pivot distance of 1.0 inch.

Figure 10:
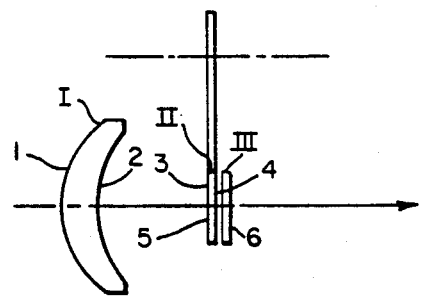

An example of a three element all plexiglass system is shown in FIG. 10 which has the following constructional data:

7th EXAMPLE

| Element Number | Surface | Radii | Separations Medium | Air | Clear Apertures | Material |
|---|---|---|---|---|---|---|
| I | 1 | 0.1397 | 0.0485 | | 0.200 | Plexi |
| | 2 | 0.1503* | | 0.0909 | 0.163 | |
| II | 3 | plano | 0.0122 | | 0.093 | Plexi |
| | 4 | base** | | 0.0150 | 0.086 | |
| III | 5 | base** | 0.0122 | | 0.085 | Plexi |

-continued

7th EXAMPLE

| Element Number | Surface | Radii | Separations Medium | Air | Clear Apertures | Material |
|---|---|---|---|---|---|---|
| | 6 | 2.897 | | 0.8006# | 0.092 | |

*Rotational Aspheric
Back focal distance
**Non-rotational (polynomial) according to present design.
$\bar{l}_d = 0.9974$
$s_1$ (adopted mean object distance) $= 13.93$
$\bar{l}_d/10$
Rotational coefficients are:
$beta_2 = 1.928 \times 10^1$
$gamma_2 = 1.018 \times 10^2$
$delta_2 = 1.191 \times 10^5$
$epsilon_2 = 1.258 \times 10^5$ Surfaces 4 and 5 are the polynomial surfaces, although surface 3 can also be drawn upon as a polynomial surface together with revised optimization over surfaces 3, 4 and 5 collectively.

It should be noted that surface 5 contains implicitly dioptric power and corrective rotational aspheric terms as a base system, all of which are thereafter contained within and replaced by the polynomial coefficients given, as follows:

| Rotatable Surface | | Fixed Surface | |
|---|---|---|---|
| Coefficient | Value | Coefficient | Value |
| $B_{410} =$ | $-0.17099 \times 10-01$ | $B_{510} =$ | $-0.17225 \times 10-01$ |
| $B_{401} =$ | $0.22753 \times 10-02$ | $B_{501} =$ | $0.22097 \times 10-02$ |
| $B_{420} =$ | $0.16375 \times 10+00$ | $B_{520} =$ | $0.93754 \times 10+00$ |
| $B_{411} =$ | $0.94617 \times 10-01$ | $B_{511} =$ | $0.95766 \times 10-01$ |
| $B_{402} =$ | $0.15192 \times 10+00$ | $B_{502} =$ | $0.92366 \times 10+00$ |
| $B_{430} =$ | $0.99257 \times 10+00$ | $B_{530} =$ | $0.10052 \times 10+01$ |
| $B_{421} =$ | $-0.21431 \times 10+00$ | $B_{521} =$ | $-0.24252 \times 10+00$ |
| $B_{412} =$ | $0.14404 \times 10+01$ | $B_{512} =$ | $0.14626 \times 10+01$ |
| $B_{403} =$ | $-0.26486 \times 10+00$ | $B_{503} =$ | $-0.26536 \times 10+00$ |
| $B_{440} =$ | $-0.95951 \times 10-02$ | $B_{540} =$ | $-0.16220 \times 10+02$ |
| $B_{431} =$ | $-0.14827 \times 10+01$ | $B_{531} =$ | $-0.11177 \times 10+01$ |
| $B_{422} =$ | $-0.19776 \times 10+01$ | $B_{522} =$ | $-0.37242 \times 10+02$ |
| $B_{413} =$ | $-0.68388 \times 10+01$ | $B_{513} =$ | $-0.58275 \times 10+01$ |
| $B_{404} =$ | $0.32939 \times 10-01$ | $B_{504} =$ | $-0.16024 \times 10+02$ |
| $B_{450} =$ | $0.30359 \times 10+00$ | $B_{550} =$ | $-0.48918 \times 10+01$ |
| $B_{441} =$ | $0.16705 \times 10+02$ | $B_{541} =$ | $0.17317 \times 10+02$ |
| $B_{432} =$ | $-0.74565 \times 10+02$ | $B_{532} =$ | $-0.85360 \times 10+02$ |
| $B_{423} =$ | $-0.24712 \times 10+02$ | $B_{523} =$ | $-0.25217 \times 10+02$ |
| $B_{414} =$ | $0.63656 \times 10+02$ | $B_{514} =$ | $0.37524 \times 10+02$ |
| $B_{405} =$ | $0.16952 \times 10+02$ | $B_{505} =$ | $0.13567 \times 10+02$ |
| $B_{460} =$ | $0.10214 \times 10-01$ | $B_{560} =$ | $0.16309 \times 10+04$ |
| $B_{451} =$ | $-0.24900 \times 10+00$ | $B_{551} =$ | $-0.24904 \times 10+00$ |
| $B_{442} =$ | $-0.13165 \times 10-01$ | $B_{542} =$ | $0.48277 \times 10+04$ |
| $B_{433} =$ | $0.14230 \times 10+00$ | $B_{533} =$ | $0.14231 \times 10+00$ |
| $B_{424} =$ | $0.51671 \times 10-02$ | $B_{524} =$ | $0.48275 \times 10+04$ |
| $B_{415} =$ | $0.56869 \times 10-01$ | $B_{515} =$ | $0.56893 \times 10-01$ |
| $B_{406} =$ | $0.10566 \times 10-02$ | $B_{506} =$ | $0.16295 \times 10+04$ |
| $B_{470} =$ | $0.12357 \times 10+00$ | $B_{570} =$ | $0.11882 \times 10+00$ |
| $B_{461} =$ | $0.13049 \times 10-01$ | $B_{561} =$ | $0.13060 \times 10+01$ |
| $B_{452} =$ | $0.10837 \times 10+02$ | $B_{552} =$ | $0.10856 \times 10+02$ |
| $B_{443} =$ | $0.16926 \times 10+00$ | $B_{543} =$ | $0.16902 \times 10+00$ |
| $B_{434} =$ | $-0.27865 \times 10+01$ | $B_{534} =$ | $-0.27805 \times 10+01$ |
| $B_{425} =$ | $-0.27037 \times 10+00$ | $B_{525} =$ | $-0.27089 \times 10+00$ |
| $B_{416} =$ | $-0.29553 \times 10+01$ | $B_{516} =$ | $-0.29934 \times 10+01$ |
| $B_{407} =$ | $-0.73066 \times 10+00$ | $B_{507} =$ | $-0.74757 \times 10+00$ |
| $B_{480} =$ | $0.12233 \times 10-02$ | $B_{580} =$ | $0.45586 \times 10+03$ |
| $B_{471} =$ | $-0.39020 \times 10-03$ | $B_{571} =$ | $-0.39020 \times 10-03$ |
| $B_{462} =$ | $-0.28819 \times 10-03$ | $B_{562} =$ | $0.18234 \times 10+04$ |
| $B_{543} =$ | $-0.77884 \times 10-04$ | $B_{553} =$ | $-0.77884 \times 10-04$ |
| $B_{444} =$ | $0.20034 \times 10-04$ | $B_{544} =$ | $0.27351 \times 10+04$ |
| $B_{435} =$ | $0.63118 \times 10-04$ | $B_{535} =$ | $0.63118 \times 10-04$ |
| $B_{426} =$ | $0.64329 \times 10-04$ | $B_{526} =$ | $0.18234 \times 10+04$ |
| $B_{417} =$ | $0.62391 \times 10-04$ | $B_{517} =$ | $0.62392 \times 10-04$ |
| $B_{408} =$ | $0.47259 \times 10-04$ | $B_{508} =$ | $0.45585 \times 10+03$ |

Figure 11:
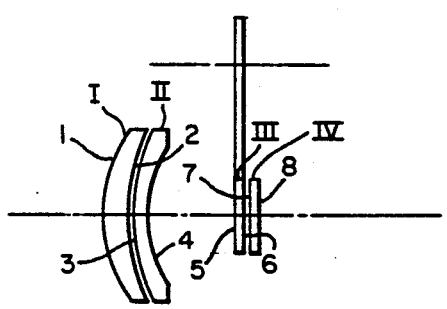

As a last example, the 8th, there is shown in FIG. 11 a four element focusable objective which utilizes a glass replacement pair of elements, instead of the front plexiglass element of the 7th example, to get improved correction for chromatic aberration. This system has constructional data as follows:

8th EXAMPLE

| Element Number | Surface | Radii | Separations Medium | Air | Clear Apertures | Material |
|---|---|---|---|---|---|---|
| I | 1 | 0.1450 | 0.0292 | | 0.200 | SK-5 |
| | 2 | 0.2694 | | 0.0048 | 0.192 | (Glass) |
| II | 3 | 0.2670 | 0.0152 | | 0.188 | Sty- |
| | 4 | 0.1503* | | 0.0909 | 0.161 | rene |
| III | 5 | plano | 0.0122 | | 0.093 | Plexi |
| | 6 | base** | | 0.0150 | 0.086 | |
| IV | 7 | base** | 0.0122 | | 0.085 | Plexi |
| | 8 | 2.897 | | 0.8006# | 0.092 | |

*Rotational Aspheric
Back focal distance
**Non-rotational (polynominal) according to present design.
$\bar{f}_d = 1.0063$
$s_1$ (adopted mean object distance) = 13.93
$\bar{f}_d/10$
Rotational surface coefficients are:
$beta_4 = 1.508 \times 10^1$
$gamma_4 = 1.363 \times 10^1$
$delta_4 = 1.030 \times 10^5$
$epsilon_4 = 1.046 \times 10^5$ Surfaces 6 and 7 are the polynomial surfaces, although surface 5 can also be drawn upon as a polynomial surface together with revised optimization over surfaces 5, 6 and 7 collectively.

It should be noted that surface 7 contains implicitly dioptric power and corrective rotational aspheric terms as a base system, all of which are thereafter contained within and replaced by the polynomial coefficients given, as follows:

| Rotatable Surface | | Fixed Surface | |
|---|---|---|---|
| Coefficient | Value | Coefficient | Value |
| $B_{610} =$ | $-0.17099 \times 10-01$ | $B_{710} =$ | $-0.17225 \times 10-01$ |
| $B_{601} =$ | $0.22753 \times 10-02$ | $B_{701} =$ | $0.22097 \times 10-02$ |
| $B_{620} =$ | $0.16375 \times 10+00$ | $B_{720} =$ | $0.93574 \times 10+00$ |
| $B_{611} =$ | $0.94617 \times 10-01$ | $B_{711} =$ | $0.95766 \times 10-01$ |
| $B_{602} =$ | $0.15192 \times 10+00$ | $B_{702} =$ | $0.92366 \times 10+00$ |
| $B_{630} =$ | $0.99257 \times 10+00$ | $B_{730} =$ | $0.10052 \times 10+01$ |
| $B_{621} =$ | $-0.21431 \times 10+00$ | $B_{721} =$ | $-0.24252 \times 10+00$ |
| $B_{612} =$ | $0.14404 \times 10+01$ | $B_{712} =$ | $0.14626 \times 10+01$ |
| $B_{603} =$ | $-0.26486 \times 10+00$ | $B_{703} =$ | $-0.26536 \times 10+00$ |
| $B_{640} =$ | $-0.95951 \times 10-02$ | $B_{740} =$ | $-0.16220 \times 10+02$ |
| $B_{631} =$ | $-0.14827 \times 10+01$ | $B_{731} =$ | $-0.11177 \times 10+01$ |
| $B_{622} =$ | $-0.19776 \times 10+01$ | $B_{722} =$ | $-0.37242 \times 10+02$ |
| $B_{613} =$ | $-0.68388 \times 10+01$ | $B_{713} =$ | $-0.58275 \times 10+01$ |
| $B_{604} =$ | $0.32939 \times 10-01$ | $B_{704} =$ | $-0.16024 \times 10+02$ |
| $B_{650} =$ | $0.30359 \times 10+00$ | $B_{750} =$ | $-0.48918 \times 10+01$ |
| $B_{641} =$ | $0.16705 \times 10+02$ | $B_{741} =$ | $0.17317 \times 10+02$ |
| $B_{632} =$ | $-0.74565 \times 10+02$ | $B_{732} =$ | $-0.85360 \times 10+02$ |
| $B_{623} =$ | $-0.24712 \times 10+02$ | $B_{723} =$ | $-0.25217 \times 10+02$ |
| $B_{614} =$ | $0.63656 \times 10+02$ | $B_{714} =$ | $0.37524 \times 10+02$ |
| $B_{605} =$ | $0.16952 \times 10+02$ | $B_{705} =$ | $0.13567 \times 10+02$ |
| $B_{660} =$ | $0.10214 \times 10-01$ | $B_{760} =$ | $0.16309 \times 10+04$ |
| $B_{651} =$ | $-0.24900 \times 10+00$ | $B_{751} =$ | $-0.24904 \times 10+00$ |
| $B_{642} =$ | $-0.13165 \times 10-01$ | $B_{742} =$ | $0.48277 \times 10+04$ |
| $B_{633} =$ | $0.14230 \times 10+00$ | $B_{733} =$ | $0.14231 \times 10+00$ |
| $B_{624} =$ | $0.51671 \times 10-02$ | $B_{724} =$ | $0.48275 \times 10+04$ |
| $B_{615} =$ | $0.56869 \times 10-01$ | $B_{715} =$ | $0.56893 \times 10-01$ |
| $B_{606} =$ | $0.10566 \times 10-02$ | $B_{706} =$ | $0.16295 \times 10+04$ |
| $B_{670} =$ | $0.12357 \times 10+00$ | $B_{770} =$ | $0.11882 \times 10+00$ |
| $B_{661} =$ | $0.13049 \times 10+01$ | $B_{761} =$ | $0.13060 \times 10+01$ |
| $B_{652} =$ | $0.10837 \times 10+02$ | $B_{752} =$ | $0.10856 \times 10+02$ |
| $B_{643} =$ | $0.16926 \times 10+00$ | $B_{743} =$ | $0.16902 \times 10+00$ |
| $B_{634} =$ | $-0.27865 \times 10+01$ | $B_{734} =$ | $-0.27805 \times 10+01$ |
| $B_{625} =$ | $-0.27037 \times 10+00$ | $B_{725} =$ | $-0.27089 \times 10+00$ |
| $B_{616} =$ | $-0.29553 \times 10+01$ | $B_{216} =$ | $-0.29934 \times 10+01$ |
| $B_{607} =$ | $-0.73066 \times 10+00$ | $B_{707} =$ | $-0.74757 \times 10+00$ |
| $B_{680} =$ | $0.12233 \times 10-02$ | $B_{780} =$ | $0.45586 \times 10+03$ |
| $B_{671} =$ | $-0.39020 \times 10-03$ | $B_{771} =$ | $-0.39020 \times 10-03$ |
| $B_{662} =$ | $-0.28819 \times 10-03$ | $B_{762} =$ | $0.18234 \times 10+04$ |
| $B_{653} =$ | $-0.77884 \times 10-04$ | $B_{753} =$ | $-0.77884 \times 10-04$ |
| $B_{644} =$ | $0.20034 \times 10-04$ | $B_{744} =$ | $0.27351 \times 10+04$ |
| $B_{635} =$ | $0.63118 \times 10-04$ | $B_{735} =$ | $0.63118 \times 10-04$ |
| $B_{626} =$ | $0.64329 \times 10-04$ | $B_{726} =$ | $0.18234 \times 10+04$ |
| $B_{617} =$ | $0.62391 \times 10-04$ | $B_{717} =$ | $0.62392 \times 10-04$ |
| $B_{608} =$ | $0.47259 \times 10-04$ | $B_{708} =$ | $0.45585 \times 10+03$ |

Obviously, the foregoing examples may be rescaled, and in this process it is required to redetermine numerical values to go with the rescaling for the new physical size. In the simplest application where all numerical quantities are given in terms of physical length, such as inches or millimeters, scaling to some other value means only applying some factor to all dimensional quantities, such as radii, separations and clear apertures.

There are other quantities which are non-linear, however, such as the beta, gamma, delta, etc. of the aspheric coefficients. Inverse quantities such as curvatures must be scaled inversely, etc. If in addition, one works from one unit length to another, such that $\bar{f}_d$ in one system transforms to some other value in the other system, then the required scaling becomes more elaborate. A check can always be made, however, by transforming both systems through english or metric measures as an intermediate device.

Let us suppose that we wish to transform a system having $\bar{f}_d = 1.250$ to a numerical system having $\bar{f}_d = 1.000$. We need only to divide all dimensional quantities by 1.250 or multiply by 0.800. Thus, $\bar{f}_d = 1.250/1.250$ becomes the desired $\bar{f}_d = 1.000$. If $R_1 = 2.500$ for example, then in the scaled system $R_1 = 2.000$, etc. Or, $R_1 = 2.50 \times 0.800 = 2.000$ directly.

Beta scales as the cube, gamma by the fifth power, delta by the 7th, etc., but inversely. That is, for the example above, beta scales by $(0.800)^3$, gamma by $(0.800)^5$, delta by $(0.800)^7$, etc.

It will be obvious to those skilled in the art that changes may be made in the above-described embodiments without departing from the scope of the invention. But, in any optical design making use of the invention at least one pair of closely adjacent but opposed dioptric surfaces of preferred analytic forms which lie respectively on closely adjacent lens elements, must be included. At least one of this pair of elements is then rotated about a pivot point displaced by an assignable distance from the optical axis and therefore transversely about an axis parallel to the optical axis. Any element so rotated must then employ either a plane surface for its outlying surface such that the transverse rotation about the displaced parallel axis causes no perceptible change in the dioptric action of this transverse plane surface, or in special cases one may apportion the work of the analytic surface from its one original face, instead, over both of the surfaces of the element.

Conversely, if one of the pair of elements is to remain fixed in order that all focusing action is effected by means of the transverse rotation of the other about a displaced axis, then the outlying surface of the fixed element may be designed as with any other outlying dioptric surface or element of the optical system, and may therefore have such rotational dioptric and aspheric powers as may prove advantageous. In special cases one may apportion the work of the fixed analytic surface amongst the two surfaces of the element, in which instance the action of the so apportioned analytic surface becomes superimposed onto the base dioptric and aspheric powers of the outlying surface of the fixed element, whatever they may be. The converse also applies.

In the most general case one may require that both elements of a pair rotate individually about assigned displaced pivot points and displaced parallel axes, either equally but oppositely in sense of rotation as a selected important variant, or with proportional rotations of the same or opposite sense as may be desired, or even non-linearly in dual rotations of the same or opposite sense where such control may be required. All such transversely rotated elements must therefore have either plane out-lying surfaces that rotate in their own planes without optical effect, or must have the work of the respective analytic surfaces apportioned amongst the surfaces.

Thus, it has been shown that with proper selection of parameters for the adjacent analytic surfaces one can effect the refractive action of a rotational dioptric lens taken mathematically to be of variable power to an order of precision sufficient for hand photography with cameras of moderate to small focal lengths and aperture-ratios. It has also been shown that further corrections normally effected by use of rotational aspheric terms on one or more nearby fixed rotational surfaces can when necessary be taken over into a further elaboration of the analytic function defining the shape of the fixed surface of the cooperative pair of surfaces. That is to say, if one is dealing with the two analytic refractive surfaces which already are aspheric in a broad sense, it may not then be necessary to employ one or more other nearby rotational aspherics. Instead, the action can be combined with the fixed member of the pair of analytic surfaces, which differ from one another for just that purpose, the fixed analytic function containing therefore superimposed rotational dioptric and aspheric powers not shared by the analytic shape of the movable or rotatory opposed surface. Therefore, it is intended that all matters contained in the above description or shown in the accompanying drawings shall be interpreted as illustrative and not in a limiting sense.

We claim:

1. An analytic function optical component comprising at least one transparent element that is disposed along an optical axis, said element having on one side a first surface that has a predetermined shape which is at least a part of a surface of revolution and on the other side thereof a second aspheric surface that is nonrotationally symmetric and mathematically described by a preselected polynomial equation having a nonzero term of at least 4th order, said first and second surfaces of said element being structured so that said element can be displaced generally laterally relative to said optical axis by rotation of said element about an axis of revolution other than said optical axis such that said second surface of said element operates to continuously change certain optical properties of said component as said element moves relative to said optical axis while said first surface of said element remains optically invariant, not effecting any changes in any optical properties of said component, as said element moves relative to said optical axis.

2. The component of claim 1 wherein said first surface is planar.

3. The component of claim 1 wherein said axis of revolution is offset and parallel with respect to said optical axis.

4. The component of claim 1 wherein said polynomial equation describing said second surface is in Cartesian coordinates of the form:

$$z = K_1(xy^2 + \tfrac{1}{3}x^3) - K_2 x^3 y + K_3 xy^3$$

where $K_1$ is assignable constants and $$K_2 = -\frac{1}{3a} K_1 \text{ and } K_3 = -\frac{1}{a} K_1.$$

5. The component of claim 1 wherein said polynomial equation describing said second surface is in Cartesian coordinates of the form:

$$z = K_1(xy^2 + \tfrac{1}{3}x^3) - K_2 x^3 y + K_3 xy^3 + K_4 x^4 + K_5 x^2 y^2$$

where $K_1$-$K_4$ are assignable constants and $K_5 = 2K_4$ plus residue conveniently set to zero.

6. An analytic function optical component comprising at least one pair of transparent elements that are disposed in tandem along an optical axis, said elements each having on one side a first surface that has a predetermined shape which is at least a part of a surface of revolution and on the other side thereof a second aspheric surface that is nonrotationally symmetric and mathematically described by a preselected polynomial equation having a nonzero term of at least 4th order, said first and second surfaces of said elements being structured so that said elements can be displaced generally laterally relative to one another by rotation of one or both of said elements about one or more axes of revolution, other than said optical axis, such that said second surfaces of said elements operate to continuously change certain optical properties of said component as said elements move relative to one another while said first surfaces of said elements remain optically invariant, not effecting any changes in any optical properties of said component, as said elements move relative to one another.

7. The component of claim 6 wherein said first surface is planar.

8. The component of claim 6 wherein said axis or axes of revolution is offset and parallel with respect to said optical axis.

9. The component of claim 6 wherein said polynomial equation describing said second surface is in Cartesian coordinates of the form:

$$z = K_1(xy^2 + \tfrac{1}{3}x^3) - K_2 x^3 y + K_3 xy^3$$

where $K_1$ is assignable constants and $$K_2 = -\frac{1}{3a} K_1 \text{ and } K_3 = -\frac{1}{a} K_1$$

10. The component of claim 6 wherein said polynomial equation describing said second surface is in Cartesian coordinates of the form:

$$z = K_1(xy^2 + \tfrac{1}{3}x^3) - K_2 x^3 y + K_3 xy^3 + K_4 x^4 + K_5 x^2 y^2$$

where $K_1$-$K_4$ are assignable constants and $K_5 = 2K_4$ plus residue conveniently set to zero.

11. An analytic function optical component comprising a plurality of transparent elements that are disposed in tandem along an optical axis, the outwardly facing sides of the outer ones of said elements each having a surface that has a predetermined shape which is at least a part of a surface of revolution while the inwardly facing sides of said outer elements and each of the oppositely facing sides of the remaining ones of said elements have an aspheric surface that is nonrotationally symmetric and mathematically described by a preselected polynomial equation having a nonzero term of at least 4th order, said surfaces of said elements being structured so that said elements can be displaced generally laterally relative to one another by rotation of one or more of said elements about one or more axes of revolution, other than said optical axis, such that said nonrotationally symmetric aspheric surfaces of said elements operate to continuously change certain optical properties of said component as said elements move relative to one another while said outer surfaces of said outer elements remain optically invariant, not effecting any changes in any optical properties of said component, as said elements move relative to one another.

12. The component of claim 11 wherein said first surface is planar.

13. The component of claim 11 wherein said axis or axes of revolution is offset and parallel with respect to said optical axis.

14. The component of claim 11 wherein said polynomial equation describing said second surface is in Cartesian coordinates of the form:

$$z = K_1(xy^2 + \tfrac{1}{3}x^3) - K_2 x^3 y + K_3 xy^3$$

where $K_1$ is assignable constants and $$K_2 = -\frac{1}{3a} K_1 \text{ and } K_3 = -\frac{1}{a} K_1.$$

15. The component of claim 11 wherein said polynomial equation describing said second surface is in Cartesian coordinates of the form:

$$z = K_1(xy^2 + \tfrac{1}{3}x^3) - K_2 x^3 y + K_3 xy^3 + K_4 x^4 + K_5 x^2 y^2$$

where $K_1$-$K_4$ are assignable constants and $K_5 = 2K_4$ plus residue conveniently set to zero.

16. An optical system comprising an analytic function optical component having at least one transparent element that is disposed along an optical axis, said element having on one side a first surface that has a predetermined shape which is at least a part of a surface of revolution and on the other side thereof a second aspheric surface that is nonrotationally symmetric and mathematically described by a preselected polynomial equation having a nonzero term of at least 4th order, said first and second surfaces of said element being structured so that said element can be displaced generally laterally relative to said optical axis by rotation of said element about an axis of revolution, other than said optical axis, such that said second surface of said element operates to continuously change certain optical properties of said optical system as said element moves relative to said optical axis while said first surface of said element remains optically invariant, not effecting any changes in any optical properties of said optical system, as said element moves relative to said optical axis.

17. The component of claim 16 wherein said first surface is planar.

18. The component of claim 16 wherein said axis of revolution is offset and parallel with respect to said optical axis.

19. The component of claim 16 wherein said polynomial equation describing said second surface is in Cartesian coordinates of the form:

$$z = K_1(xy^2 + \tfrac{1}{3}x^3) - K_2 x^3 y + K_3 xy^3$$

where $K_1$ is assignable constants and $$K_2 = -\frac{1}{3a} K_1 \text{ and } K_3 = -\frac{1}{a} K_1.$$

20. The component of claim 16 wherein said polynomial equation describing said second surface is in Cartesian coordinates of the form:

$$z = K_1(xy^2 + \tfrac{1}{3}x^3) - K_2 x^3 y + K_3 xy^3 + K_4 x^4 + K_5 x^2 y^2$$

where $K_1$-$K_4$ are assignable constants and $K_5 = 2K_4$ plus residue conveniently set to zero.

21. An optical system comprising at least a pair of analytic function optical components arranged in tandem along an optical axis and each component having at least one transparent element that is disposed along said optical axis, said elements each having on one side a first surface that has a predetermined shape which is at least a part of a surface of revolution and on the other side thereof a second, aspheric surface that is nonrotationally symmetric and mathematically described by a preselected polynomial equation having a nonzero term of at least 4th order, said first and second surfaces of said elements being structured so that said elements can be displaced generally laterally relative to one another by rotation of one or both of said elements about one or more axes of revolution, other than said optical axis, such that said second surfaces of said elements operate to continuously change certain optical properties of said optical system as said elements move relative to one another while said first surfaces of said elements remain optically invariant, not effecting any changes in any optical properties of said optical system, as said elements move relative to one another.

22. The component of claim 21 wherein said first surface is planar.

23. The component of claim 21 wherein said axis or axes of revolution is offset and parallel with respect to said optical axis.

24. The component of claim 21 wherein said polynomial equation describing said second surface is in Cartesian coordinates of the form:

$$z = K_1(xy^2 + \tfrac{1}{3}x^3) - K_2 x^3 y + K_3 xy^3$$

where $K_1$ is assignable constants and $$K_2 = -\frac{1}{3a} K_1 \text{ and } K_3 = -\frac{1}{a} K_1.$$

25. The component of claim 21 wherein said polynomial equation describing said second surface is in Cartesian coordinates of the form:

$$z = K_1(xy^2 + \tfrac{1}{3}x^3) - K_2 x^3 y + K_3 xy^3 + K_4 x^4 + K_5 x^2 y^2$$

where $K_1$–$K_4$ are assignable constants and $K_5=2K_4$ plus residue conveniently set to zero.

26. The system of claim 21 wherein said optical system includes at least one positive meniscus lens element located along said optical axis and forward of said pair of analytic function components.

27. The system of claim 21 wherein said optical system includes one positive glass meniscus lens element located along said optical axis and forward of said pair of analytic function components.

28. The system of claim 21 wherein all components thereof are comprised of a single material.

29. The system of claim 28 wherein said single material is an optical plastic.

30. An optical system comprising an analytic function optical component having a plurality of transparent elements that are disposed in tandem along an optical axis, the outwardly facing sides of the outer ones of said elements each having a surface that has a predetermined shape which is at least a part of a surface of revolution while the inwardly facing sides of said outer elements and each of the oppositely facing sides of the remaining ones of said elements have an aspheric surface that is nonrotationally symmetric and mathematically described by a preselected polynomial equation having a nonzero term of at least 4th order, said surfaces of said elements being structured so that said elements can be displaced generally laterally relative to one another by rotation of one or more of said elements about one or more axes of revolution, other than said optical axis, such that said nonrotationally symmetric aspheric surfaces of said elements operate to continuously change certain optical properties of said optical system as said elements move relative to one another while said outer surfaces of said outer elements remain optically invariant, not effecting any changes in any optical properties of said optical system as said elements move relative to one another.

31. The component of claim 30 wherein said first surface is planar.

32. The component of claim 30 wherein said axis or axes of revolution is offset and parallel with respect to said optical axis.

33. The component of claim 30 wherein said polynomial equation describing said second surface is in Cartesian coordinates of the form:

$$z=K_1(xy^2+\tfrac{1}{3}x^3)-K_2x^3y+K_3xy^3$$

where $K_1$ is assignable constants and $$K_2 = -\frac{1}{3a} K_1 \text{ and } K_3 = -\frac{1}{a} K_1.$$

34. The component of claim 30 wherein said polynomial equation describing said second surface is in Cartesian coordinates of the form:

$$z=K_1(xy^2+\tfrac{1}{3}x^3)-K_2x^3y+K_3xy^3+K_4x^4+K_5x^2y^2$$

where $K_1$–$K_4$ are assignable constants and $K_5=2K_4$ plus residue conveniently set to zero.

35. An analytic function optical component comprising a plurality of transparent elements that are disposed in tandem along an optical axis, the outwardly facing side of one of the outer ones of said elements having a surface that has a predetermined shape which is at least a part of a surface of revolution while the outwardly facing side of the remaining outer element and the inwardly facing sides of said outer elements and each of the oppositely facing sides of the remaining ones of said elements have an aspheric surface that is nonrotationally symmetric and mathematically described by a preselected polynomial equation having a nonzero term of at least 4th order, said surfaces of said elements being structured so that said elements can be displaced generally laterally relative to one another by rotation of one or more of said elements about one or more axes of revolution, other than said optical axis, such that said nonrotationally symmetric aspheric surfaces of said elements operate to continuously change certain optical properties of said component as said elements move relative to one another while said outer surface of said one outer element remains optically invariant, not effecting any changes in any optical properties of said component, as said elements move relative to one another.

36. The component of claim 35 wherein said first surface is planar.

37. The component of claim 35 wherein said polynomial equation describing said second surface is in Cartesian coordinates of the form:

$$z=K_1(xy^2+\tfrac{1}{3}x^3)-K_2x^3y+K_3xy^3$$

where $K_1$ is assignable constants and $$K_2 = -\frac{1}{3a} K_1 \text{ and } K_3 = -\frac{1}{a} K_1.$$

38. The component of claim 35 wherein said polynomial equation describing said second surface is in Cartesian coordinates of the form:

$$z=K_1(xy^2+\tfrac{1}{3}x^3)-K_2x^3y+K_3xy^3+K_4x^4+K_5x^2y^2$$

where $K_1$–$K_4$ are assignable constants and $K_5=2K_4$ plus residue conveniently set to zero.

* * * * *